United States Patent
Berrian et al.

(10) Patent No.: US 12,032,628 B2
(45) Date of Patent: Jul. 9, 2024

(54) METHODS AND APPARATUS TO FINGERPRINT AN AUDIO SIGNAL VIA EXPONENTIAL NORMALIZATION

(71) Applicant: Gracenote, Inc., Emeryville, CA (US)

(72) Inventors: Alexander Berrian, Emeryville, CA (US); Matthew James Wilkinson, Emeryville, CA (US); Robert Coover, Orinda, CA (US)

(73) Assignee: Gracenote, Inc., Emeryville, CA (US)

( * ) Notice: Subject to any disclaimer, the term of this patent is extended or adjusted under 35 U.S.C. 154(b) by 647 days.

(21) Appl. No.: 16/696,874

(22) Filed: Nov. 26, 2019

(65) Prior Publication Data

US 2021/0157838 A1    May 27, 2021

(51) Int. Cl.
*G10L 25/51* (2013.01)
*G06F 16/683* (2019.01)
*G10L 25/21* (2013.01)

(52) U.S. Cl.
CPC ............ *G06F 16/683* (2019.01); *G10L 25/21* (2013.01); *G10L 25/51* (2013.01)

(58) Field of Classification Search
CPC ........ G06F 16/683; G10L 25/21; G10L 25/51
(Continued)

(56) References Cited

U.S. PATENT DOCUMENTS 6,363,345 B1 * 3/2002 Marash ................... G10L 25/78
                                                      704/226
9,202,472 B1 * 12/2015 Sharifi .................. G10L 19/018
(Continued)

FOREIGN PATENT DOCUMENTS

JP    200605821    2/2006
JP    201618663    6/2016
(Continued)

OTHER PUBLICATIONS

Institut National De La Propriete Industrielle, "Written Communcation," dated Jan. 21, 2019 in connection with French Patent Application No. FR1858041 (3 pages, including a machine translation).
(Continued)

*Primary Examiner* — Pierre Louis Desir
*Assistant Examiner* — Nicole A K Schmieder
(74) *Attorney, Agent, or Firm* — McDonnell Boehnen Hulbert & Berghoff LLP

(57) ABSTRACT

Methods, apparatus, systems, and articles of manufacture are disclosed to fingerprint an audio signal via exponential normalization. An example apparatus includes an audio segmenter to divide an audio signal into a plurality of audio segments including a first audio segment and a second audio segment, the first audio segment including a first time-frequency bin, the second audio segment including a second time-frequency bin, a mean calculator to determine a first exponential mean value associated with the first time frequency bin based on a first magnitude of the audio signal associated with the first time frequency bin and a second exponential mean value associated with the second time frequency bin based on a second magnitude of the audio signal associated with the second time frequency bin and the first exponential mean value. The example apparatus further includes a bin normalizer to normalize the first time-frequency bin based on the second exponential mean value and a fingerprint generator to generate a fingerprint of the audio signal based on the normalized first time-frequency bins.

14 Claims, 9 Drawing Sheets

(58) Field of Classification Search
USPC .......................................................... 704/200
See application file for complete search history.

(56) References Cited

U.S. PATENT DOCUMENTS

| | | | |
|---|---|---|---|
| 10,866,989 B1* | 12/2020 | Chandler | G06K 9/6282 |
| 2003/0086341 A1 | 5/2003 | Wells et al. | |
| 2006/0020958 A1 | 1/2006 | Allamanche et al. | |
| 2008/0215651 A1 | 9/2008 | Sawada et al. | |
| 2009/0052784 A1 | 2/2009 | Covell et al. | |
| 2011/0035035 A1 | 2/2011 | Khan et al. | |
| 2011/0064244 A1 | 3/2011 | Eisenberg et al. | |
| 2011/0261257 A1 | 10/2011 | Terry et al. | |
| 2012/0103166 A1 | 5/2012 | Shibuya et al. | |
| 2013/0279704 A1 | 10/2013 | Crockett | |
| 2014/0114456 A1* | 4/2014 | Stavropoulos | H04H 60/37 700/94 |
| 2014/0180674 A1 | 6/2014 | Neuhauser et al. | |
| 2014/0310006 A1 | 10/2014 | Anguera Miro et al. | |
| 2016/0148620 A1 | 5/2016 | Bilobrov | |
| 2016/0247512 A1 | 8/2016 | Duong et al. | |
| 2017/0365276 A1 | 12/2017 | Greene | |
| 2019/0130032 A1 | 5/2019 | Donier et al. | |
| 2019/0139557 A1 | 5/2019 | Hodgson et al. | |
| 2020/0082835 A1 | 3/2020 | Coover et al. | |
| 2021/0157838 A1 | 5/2021 | Berrian et al. | |

FOREIGN PATENT DOCUMENTS

| | | |
|---|---|---|
| KR | 2013005515 | 5/2013 |
| KR | 1020130055115 A | 5/2013 |
| KR | 20170027648 | 3/2017 |
| KR | 20180135464 | 12/2018 |

OTHER PUBLICATIONS

Institut National De La Propriete Industrielle, "Preliminary Search Report," dated Jul. 26, 2019 in connection with French Patent Application No. FR1858041 (12 pages, including machine translation).

Wooram Son et al., "Sub-fingerprint Masking for a Robust Audio Fingerprinting System in a Real-noise Environment for Portable Consumer Devices," 2010 Digest of Technical Papers/International Conference on Consumer Electronics (ICCE 2010), Las Vegas, Nevada, Jan. 9-13, 2010, pp. 409-410, 2 pages.

International Searching Authority, "International Search Report," dated Dec. 23, 2019 in connection with International Patent Application No. PCT/US2019/049953, 3 pages.

International Searching Authority, "Written Opinion," dated Dec. 23, 2019 in connection with International Patent Application No. PCT/US2019/049953, 5 pages.

United States Patent and Trademark Office, "Non-Final Office Action," issued in connection with U.S. Appl. No. 16/453,654, dated Apr. 29, 2021, 10 pages.

European Patent Office, "Communication pursuant to Rules 161(2) and 162 EPC," issued in connection with European Patent Application No. 19857365.1, dated Apr. 14, 2021, 3 pages.

Institut National De La Propriete Industrielle, "Notice of Intention to Grant," dated Feb. 11, 2021 in connection with French patent application No. 18 58041, 2 pages. (English summary included).

International Searching Authority, "International Preliminary Report on Patentability," dated Mar. 18, 2021 in connection with International Patent Application No. PCT/US2019/049953, 7 pages.

International Searching Authority, "Written Opinion of the International Searching Authority", issued in connection with International Patent Application No. PCT/US2022/015442 dated May 18, 2022, 3 pages.

International Searching Authority, "International Search Report", issued in connection with International Patent Application No. PCT/US2022/015442 dated May 18, 2022, 4 pages.

Canadian Intellectual Property Office, "Examination Report", issued in connection with Canadian Patent Application No. 3,111,800 dated Mar. 7, 2022, 4 pages.

IP Australia, "Examination Report No. 1", issued in connection with Australian Patent Application No. 2019335404 dated Jan. 27, 2022, 3 pages.

International Searching Authority, "Written Opinion of the International Searching Authority", issued in connection with International Patent Application No. PCT/US2020/061077 dated Mar. 5, 2021, 3 pages.

International Searching Authority, "International Search Report", issued in connection with International Patent Application No. PCT/US2020/061077 dated Mar. 5, 2021, 3 pages.

International Searching Authority, "International Preliminary Report on Patentability", issued in connection with International Patent Application No. PCT/US2019/049953 dated Mar. 9, 2021, 7 pages.

European Patent Office, "Communication of European Publication Number and Information on the Application of Article 67(3) EPC", issued in connection with European Patent Application No. 20891501.7 dated Sep. 7, 2022, 1 page.

Japanese Patent Office, "Notice of Reasons for Rejection", issued in connection with Japanese Patent Application No. 2021-512712 dated Apr. 26, 2022, 6 pages, (English Translation Included).

European Patent Office, "Extended European Search Report", issued in connection with European Patent Application No. 19857365.1 dated Jun. 7, 2022, 8 pages.

European Patent Office, "Communication Pursuant to Rules 161(2) and 162 EPC", issued in connection with European Patent Application No. 20891501.7 dated Jul. 5, 2022, 3 pages.

IP Australia, "Notice of Acceptance for Patent Application", issued in connection with Australian Patent Application No. 2019335404 dated Aug. 10, 2022, 3 pages.

European Patent Office, "Communication Pursuant to Rules 70(2) and 70a(2) EPC", issued in connection with European Patent Application No. 19857365.1 dated Jun. 24, 2022, 1 page.

International Searching Authority, "International Preliminary Report on Patentability", issued in connection with International Patent Application No. PCT/US2020/061077 dated May 17, 2022, 4 pages.

United States Patent and Trademark Office, "Advisory Action", issued in connection with U.S. Appl. No. 16/453,654 dated Feb. 8, 2022, 3 pages.

United States Patent and Trademark Office, "Non-Final Office Action", issued in connection with U.S. Appl. No. 16/453,654 dated May 26, 2022, 10 pages.

* cited by examiner

METHODS AND APPARATUS TO FINGERPRINT AN AUDIO SIGNAL VIA EXPONENTIAL NORMALIZATION

FIELD OF THE DISCLOSURE

This disclosure relates generally to audio signals and, more particularly, to methods and apparatus to fingerprint an audio signal via exponential normalization.

BACKGROUND

Audio information (e.g., sounds, speech, music, etc.) can be represented as digital data (e.g., electronic, optical, etc.). Captured audio (e.g., via a microphone) can be digitized, stored electronically, processed and/or cataloged. One way of cataloging audio information is by generating an audio fingerprint. Audio fingerprints are digital summaries of audio information created by sampling a portion of the audio signal. Audio fingerprints have historically been used to identify audio and/or verify audio authenticity.

BRIEF DESCRIPTION OF THE DRAWINGS

The figures are not to scale. Instead, the thickness of the layers or regions may be enlarged in the drawings. In general, the same reference numbers will be used throughout the drawing(s) and accompanying written description to refer to the same or like parts.

DETAILED DESCRIPTION

Figure 1:
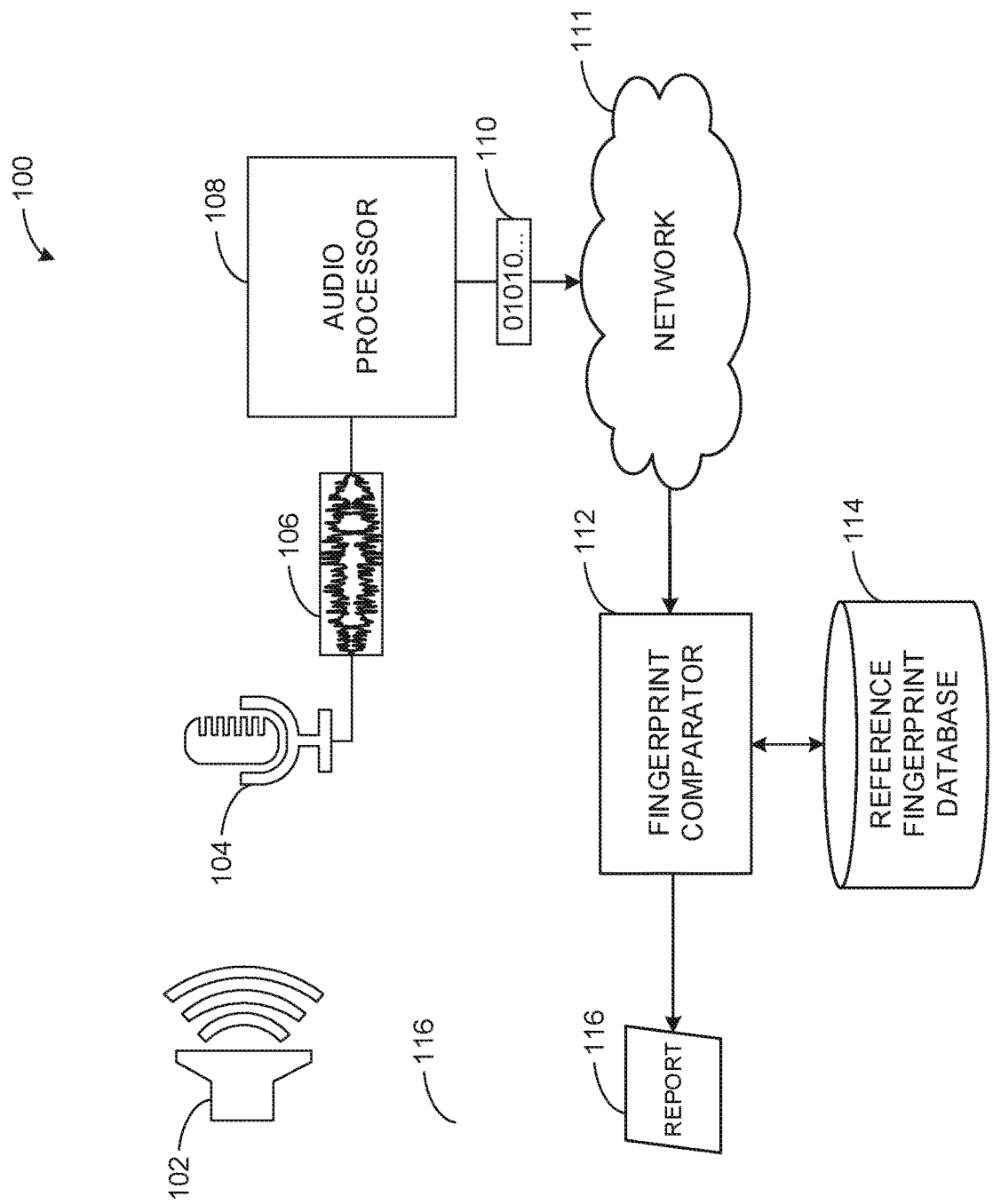
FIG. 1 is an example system in which the teachings of this disclosure may be implemented.

Descriptors first, second, third, etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as second or third. In such instances, it should be understood that such descriptors are used merely for ease of referencing multiple elements or components.

Fingerprint or signature-based media monitoring techniques generally utilize one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A signature can be a series of sub-signatures collected in series over a time interval. The term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored media signature(s) to one or more reference signatures corresponding to known (e.g., reference) media sources. Various comparison criteria, such as a cross-correlation value, a Hamming distance, etc., can be evaluated to determine whether a monitored signature matches a particular reference signature.

When a match between the monitored signature and one of the reference signatures is found, the monitored media can be identified as corresponding to the particular reference media represented by the reference signature that matched with the monitored media signature. Because attributes, such as an identifier of the media, a presentation time, a broadcast channel, etc., are collected for the reference signature, these attributes can then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

Historically, audio fingerprinting technology has used the loudest parts (e.g., the parts with the most energy, etc.) of an audio signal to create fingerprints in a time segment. In some examples, the loudest parts of an audio signal can be associated with noise (e.g., unwanted audio) and not from the audio of interest. In some examples, fingerprints generated using historic audio fingerprint technology would be generated based on the background noise and not of the audio of interest, which reduces the usefulness of the generated fingerprint. Additionally, fingerprints of music generated using these historic audio fingerprint technologies often are not generated information from all parts of the audio spectrum that can be used for signature matching because the bass spectrum of audio tends to be louder than other frequencies spectra in the audio (e.g., treble ranges, etc.). Some example methods, apparatus, systems, and articles of manufacture to overcome the above-noted deficiencies by generating fingerprints using mean normalization and are disclosed in U.S. patent application Ser. No. 16/453,654, which is hereby incorporated by reference in its entirety Example methods and apparatus disclosed herein generate a fingerprint from an audio signal using exponential mean normalization. Example methods and apparatus disclosed herein reduce the memory and bandwidth requirements to generate a fingerprint using mean normalization. An example method disclosed herein includes normalizing one or more of the time-frequency bins of the audio signal by an audio characteristic of a first adjacent audio region and an approximation of an exponential mean value corresponding to an average audio characteristic of a second adjacent audio region. As used herein, "a time-frequency bin" is a portion of an audio signal corresponding to a specific frequency bin (e.g., an FFT bin) at a specific time (e.g., three seconds into the audio signal). In some examples disclosed herein, the normalized time-frequency bins are used to generate subfingerprints, which are combined to generate a fingerprint.

Another example method disclosed herein includes matching a generated query fingerprint, sampled at a first sample rate, to fingerprint in a database of reference fingerprints, sampled at a second sample rate. In some examples disclosed herein, the first subfingerprint of the query fingerprint is compared to the subfingerprints of the reference fingerprints in the database to determine candidate reference fingerprints. In some examples disclosed herein, the first sample rate is compared to the second sample rate to determine a sample rate coefficient. In some examples disclosed herein, the subfingerprints of the query fingerprint are compared to the candidate reference fingerprint based on the sample rate coefficient to determine if the query fingerprint matches the candidate reference fingerprint.

FIG. 1 is an example system 100 in which the teachings of this disclosure can be implemented. The example system 100 includes an example audio source 102, an example microphone 104 that captures sound from the audio source 102 and converts the captured sound into an example audio signal 106. An example audio processor 108 receives the audio signal 106 and generates an example query fingerprint 110, which is transmitted over an example network 111 to an example fingerprint comparator 112. The example fingerprint comparator 112 matches the example query fingerprint 110 to fingerprints of an example reference fingerprint database 114 to generate an example media identification report 116.

The example audio source 102 emits an audible sound. The example audio source can be a speaker (e.g., an electroacoustic transducer, etc.), a live performance, a conversation and/or any other suitable source of audio. The example audio source 102 can include desired audio (e.g., the audio to be fingerprinted, etc.) and can also include undesired audio (e.g., background noise, etc.). In the illustrated example, the audio source 102 is a speaker. In other examples, the audio source 102 can be any other suitable audio source (e.g., a person, etc.).

The example microphone 104 is a transducer that converts the sound emitted by the audio source 102 into the audio signal 106. In some examples, the microphone 104 can be a component of a computer, a mobile device (a smartphone, a tablet, etc.), a navigation device, or a wearable device (e.g., a smartwatch, etc.). In some examples, the microphone can include an analog-to digital convertor to digitize the audio signal 106. In other examples, the audio processor 108 can digitize the audio signal 106.

The example audio signal 106 is a digitized representation of the sound emitted by the audio source 102. In some examples, the audio signal 106 can be saved on a computer before being processed by the audio processor 108. In some examples, the audio signal 106 can be transferred over a network to the example audio processor 108. Additionally or alternatively, any other suitable method can be used to generate the audio (e.g., digital synthesis, etc.).

The example audio processor 108 converts the example audio signal 106 into the example query fingerprint 110. In some examples, the audio processor 108 can convert some or all of the audio signal 106 into the frequency domain. In some examples, the audio processor 108 divides the audio signal into time-frequency bins. In some examples, the audio processor 108 can generate a subfingerprint using an audio characteristic of a first adjacent audio region and an approximation of an average audio characteristic of a second adjacent audio region. In some examples, the audio characteristic is the energy of the audio signal. In other examples, any other suitable audio characteristic can be determined and used to normalize each time-frequency bin (e.g., the entropy of the audio signal, etc.). Additionally or alternatively, any suitable means can be used to generate the query fingerprint 110. In some examples, some of or all of the components of the audio processor 108 can be implemented by a mobile device (e.g., a mobile device associated with the microphone 104, etc.). In other examples, the audio processor 108 can be implemented by any other suitable device(s). An example implementation of the audio processor 108 is described below in conjunction with FIG. 2.

The example query fingerprint 110 is a condensed digital summary of the audio signal 106 that can be used to identify and/or verify the audio signal 106. For example, the query fingerprint 110 can be generated by sampling portions of the audio signal 106 and processing those portions. In some examples, the query fingerprint 110 is composed of a plurality of subfingerprints, which correspond to distinct samples of the audio signal 106. In some examples, the query fingerprint 110 is associated with a period of time (e.g., six seconds, 48 seconds, etc.) of audio signal 106. In some examples, the query fingerprint 110 can include samples of the highest energy portions of the audio signal 106. In some examples, the query fingerprint 110 can be used to identify the audio signal 106 (e.g., determine what song is being played, etc.). In some examples, the query fingerprint 110 can be used to verify the authenticity of the audio. An example illustration of the query fingerprint 110 is described below in conjunction with FIG. 3.

The example network 111 is a network that allows the query fingerprint 110 to be transmitted to the fingerprint comparator 112. For example, the network 111 is a local area network (LAN), a wide area network (WAN), etc. In some examples, the network 111 is the Internet. In some examples, the network 111 is a wired connection. In some examples, the network 111 is absent. In such examples, the query fingerprint 110 can be transmitted to fingerprint comparator by any other suitable means (e.g., a physical storage device, etc.). Additionally or alternatively, the audio processor 108 and the fingerprint comparator 112 can be implemented by or at the same device (e.g., a server at a central facility of media monitoring entity, etc.).

The example fingerprint comparator 112 receives and processes the query fingerprint 110. For example, the fingerprint comparator 112 can match the query fingerprint 110 to one or more reference fingerprint(s) stored in the reference fingerprint database 114. In some examples, the fingerprint comparator 112 can compare the sample rate of the query fingerprint 110 to the sample rate (e.g., the frequency of subfingerprints, etc.) of the fingerprints stored in reference fingerprint database 114. In such examples, the fingerprint comparator 112 can compare fingerprints sampled at different sample rates based on the comparison of the sample rates by generating a sample rate coefficient. For example, the fingerprint comparator 112 can determine which subfingerprint(s) of the reference fingerprints to compare with subfingerprints of the query fingerprint 110. In some examples, the fingerprint comparator 112 can determine the query fingerprint matches none of the reference fingerprints stored in the reference fingerprint database 114. In such examples, the fingerprint comparator 112 returns a result indicating the media associated with the reference fingerprint could not be identified.

The reference fingerprint database 114 stores a plurality of reference fingerprint(s) corresponding to one or more pre-identified pieces of media. In some examples, the reference fingerprint(s) stored of reference fingerprint database 114 are generated and stored at a first sample rate (e.g., 128 milliseconds (ms), etc.). In other examples, the reference fingerprint(s) can be stored at different sample rates (e.g., 64 ms, 512 ms, etc.). The reference fingerprint database 114 can be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The reference fingerprint database 114 can additionally or alternatively be implemented by one or more double data rate (DDR) memories, such as DDR, DDR2, DDR3, DDR4, mobile DDR (mDDR), etc. The reference fingerprint database 114 can additionally or alternatively be implemented by one or more mass storage devices such as hard disk drive(s), compact disk drive(s), digital versatile disk drive(s), solid-state disk drive(s), etc. In the illustrated example of FIG. 1, the reference fingerprint database 114 is illustrated as a single database. In other examples, the reference fingerprint database 114 can be implemented by any number and/or type(s) of databases. Furthermore, the reference fingerprint(s) stored in the reference fingerprint database 114 may be in any data format. (e.g., an 8 bit integer number, a 32 bit floating point number, etc.).

The example media identification report 116 is a report that identifies the media associated with the audio signal 106. For example, the fingerprint comparator 112 can generate the media identification report 116 based a match between the query fingerprint 110 and a reference fingerprint associated with the media. For example, the media identification report 116 can be sent to the device associated with the microphone 104 (e.g., a smart phone, etc.) to enable a user of the microphone 104 to the identify the media. In some examples, the media identification report 116 can include any other suitable information (e.g., metadata, etc.).

Figure 2:
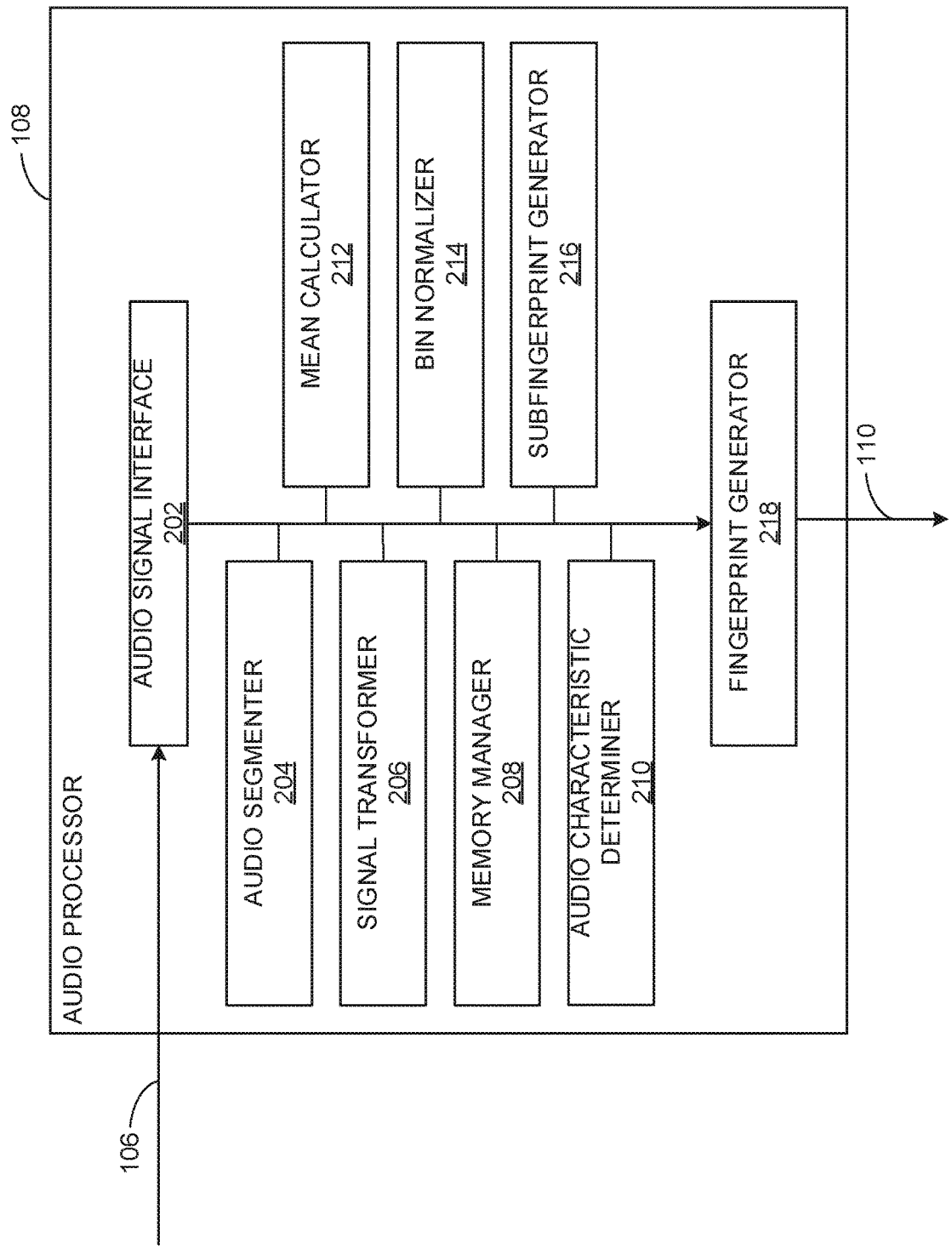
FIG. 2 is an example implementation of the audio processor of FIG. 1.

FIG. 2 is an example implementation of the audio processor 108 of FIG. 1. The example audio processor 108 includes an example audio signal interface 202, an example audio segmenter 204, an example signal transformer 206, an example memory manager 208, an example audio characteristic determiner 210, an example mean calculator 212, an example bin normalizer 214, an example subfingerprint generator 216 and an example fingerprint generator 218.

The example audio signal interface 202 receives the digitized audio signal from the microphone 104. In some examples, the audio signal interface 202 can request the digitized audio signal from the microphone 104 periodically. In other examples, the audio signal interface 202 can receive the audio signal 106 from the microphone 108 as soon as the audio is detected. In some examples when the microphone 104 is absent, the audio signal interface 202 can request the digitized audio signal 106 from a database. In some examples, the audio signal interface 202 can include an analog-to-digital converter to convert the audio received by the microphone 104 into the audio signal 106.

The example audio segmenter 204 divides the audio signal 106 into audio segments (e.g., frames, periods, etc.). For example, the audio segmenter can divide the audio signal 106 into discrete audio segments corresponding to unique portions of the audio signal 106. In some examples, the audio segmenter 204 determines which portions of the audio signal 106 correspond to each of the generated audio segments. In some examples, the audio segmenter 204 can generate segments of any suitable size.

The example signal transformer 206 transforms portions of the audio signal of the digitized audio signal 106 into the frequency domain. For example, the signal transformer 206 performs a fast Fourier transform (FFT) on an audio signal 106 to transform the audio signal 106 into the frequency domain. In other examples, the signal transformer 206 can use any suitable technique to transform the audio signal 106 (e.g., discrete Fourier transforms, a sliding time window Fourier transform, a wavelet transform, a discrete Hadamard transform, a discrete Walsh Hadamard, a discrete cosine transform, etc.). In some examples, each time-frequency bin has an associated magnitude (e.g., the magnitude of the transformed signal in that time-frequency bin, etc.). In some examples, the signal transformer 206 can be implemented by one or more band-pass filters (BPFs). In some examples, the output of the example signal transformer 206 can be represented by a spectrogram. In some examples, the signal transformer 206 works concurrently with the audio segmenter 204. An example output of the signal transformer 206 is discussed below in conjunction with FIGS. 3A and 3B.

The example memory manager 208 manages the content of the memory associated with the audio processor 108 (e.g., the volatile memory 814, the non-volatile memory 816, the local memory 813, the mass storage 828, etc.). For example, the memory manager 208 can add or remove data from buffers associated with the generation of the query fingerprint 110. In some examples, the memory manager 208 can remove information from a buffer after it is no longer used in the generation of the query fingerprint 110. For example, the memory manager 208 can remove data associated with a group of time-frequency bins (e.g., the energy values associated with each time-frequency bin, etc.) from a buffer after it is no longer needed. In some examples, the memory manager 208 removes the data associated with an audio region after the mean calculator 212 has determined the mean associated with that audio region. In some examples, the memory manager 208 converts the calculate time-frequency bin energy values to the dB (decibel) scale and rounds the values to the nearest half dB (e.g., converts to an 8-bit integer value from a 32-bit floating-point value, etc.).

The example audio characteristic determiner 210 determines the audio characteristic(s) of a portion of the audio signal 106 (e.g., an audio region associated with a time-frequency bin, etc.). The audio characteristic determiner 210 can determine the audio characteristics of a group of time-frequency bins (e.g., the energy of the portion of the audio signal 106 corresponding to each time-frequency bin in a group of time-frequency bins, the entropy of the portion of the audio signal 106 corresponding to each time-frequency bin in a group of time-frequency bins, etc.). For example, the audio characteristic determiner 210 can determine the mean energy (e.g., average power, etc.) of one or more of the audio regions associated with an audio region (e.g., the mean of the magnitudes squared of the transformed signal corresponding to the time-frequency bins in the region, etc.)

adjacent to a selected time-frequency bin. In other examples, the audio characteristic determiner 210 can determine the mean entropy of one or more of the audio regions associated with an audio region (e.g., the mean of the magnitudes of the time-frequency bins in the region, etc.) adjacent to a selected time-frequency bin. In other examples, the audio characteristic determiner 210 can determine the mean energy and/or mean entropy by any other suitable means. Additionally or alternatively, the audio characteristic determiner 210 can determine other characteristics of a portion of the audio signal (e.g., the mode energy, the median energy, the mode power, the median energy, the mean energy, the mean amplitude, etc.).

The example mean calculator 212 determines the exponential mean energy and/or entropy (e.g., a moving average energy, a moving average entropy, etc.) associated with one or more audio regions in time-frequency space. For example, the mean calculator 212 can determine the mean (e.g., average, median, etc.) energy value and/or entropy value associated with the time-frequency bins in an audio segment. In some examples, the mean calculator 212 can determine the average energy and/or the average entropy associated with two audio segments based on the mean energy and/or entropy of a subset of audio time-frequency bins of an adjacent audio region (e.g., determined by the audio characteristic determiner 210, etc.) and the mean energies of a subset of time-frequency bins in the audio region using equation (1):

$$M_2 = (1-\alpha)M_1 + \alpha S \quad (1)$$

wherein $M_2$ is an approximate mean energy and/or mean entropy of the current audio region, $\alpha$ is an empirically determined weighting coefficient (e.g., between 0 and 1, etc.), $M_1$ is the mean energy and/or mean entropy of a previous overlapping audio region and S is the magnitude or magnitude squared of the transformed signal associated with a subset of time-frequency bins in the current audio region. In other examples, the mean calculator 212 can determine the mean energy and/or mean entropy based on any other suitable means.

The example bin normalizer 214 normalizes one or more time-frequency bins by an associated audio characteristic of the surrounding audio region. For example, the bin normalizer 214 can normalize a time-frequency bin by a mean energy of the surrounding audio regions. In some examples, the bin normalizer 214 can normalize a time-frequency bin by a mean entropy of the surrounding audio regions. In other examples, the bin normalizer 214 can normalize a time-frequency bin by the exponential mean energy values and/or the exponential mean entropy values determined by the mean calculator 212. For example, the bin normalizer 214 can normalize a time-frequency bin of a previous segment (e.g., temporally behind, etc.) based on the exponential mean values calculated in connection with an audio segment (e.g., temporally in front of the previous segment, etc.). In some examples, the output(s) of the bin normalizer 214 (e.g., a plurality normalized time-frequency bin, etc.) can be represented as a spectrogram. Example outputs of the bin normalizer 214 are discussed below in conjunction with FIG. 3C.

The example subfingerprint generator 216 generates subfingerprints associated with an audio sample(s) and/or audio segment. For example, the subfingerprint generator 216 can generate subfingerprints at a first sample rate. In some examples, the subfingerprint generator 216 generates a subfingerprint of a sample after the bin normalizer 214 has normalized the energy value of each time-frequency bin in an audio segment. In some examples, the subfingerprint generator 216 generates the subfingerprint associated with a sample based on the energy extrema of the normalized time-frequency bins within the sample. In some examples, the subfingerprint generator 216 selects a group of time-frequency bins (e.g., one bin, five bins, 20 bins, etc.) with the highest normalized energy values in a sample to generate a subfingerprint.

The example fingerprint generator 218 generates a fingerprint based on the subfingerprints. For example, the fingerprint generator 218 can generate the query fingerprint 110 based on the subfingerprints generated by the subfingerprint generator 216. For example, the fingerprint generator 218 can concatenate the subfingerprints associated with each audio segment into the query fingerprint 110.

While an example manner of implementing the audio processor 108 of FIG. 1 is illustrated in FIG. 2, one or more of the elements, processes, and/or devices illustrated in FIG. 2 may be combined, divided, re-arranged, omitted, eliminated, and/or implemented in any other way. Further, the example audio signal interface 202, the example audio segmenter 204, the example signal transform 206, the example memory manager 208, the example audio characteristic determiner 210, the example mean calculator 212, the bin normalizer 214, the example subfingerprint generator 216, the example fingerprint generator 218 and/or, more generally, the example audio processor 108 of FIGS. 1 and 2 may be implemented by hardware, software, firmware, and/or any combination of hardware, software, and/or firmware. Thus, for example, any of the example audio signal interface 202, the example audio segmenter 204, the example signal transform 206, the example memory manager 208, the example audio characteristic determiner 210, the example mean calculator 212, the bin normalizer 214, the example subfingerprint generator 216, the example fingerprint generator 218, and/or, more generally, the example audio processor 108 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example audio signal interface 202, the example audio segmenter 204, the example signal transform 206, the example memory manager 208, the example audio characteristic determiner 210, the example mean calculator 212, the example bin normalizer 214, the example subfingerprint generator 216, the example fingerprint generator 218 is/are hereby expressly defined to include a non-transitory computer readable storage device or storage disk such as a memory, a digital versatile disk (DVD), a compact disk (CD), a Blu-ray disk, etc., including the software and/or firmware. Further still, the example audio processor 106 of FIGS. 1 and 2 may include one or more elements, processes, and/or devices in addition to, or instead of, those illustrated in FIG. 2, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3A:
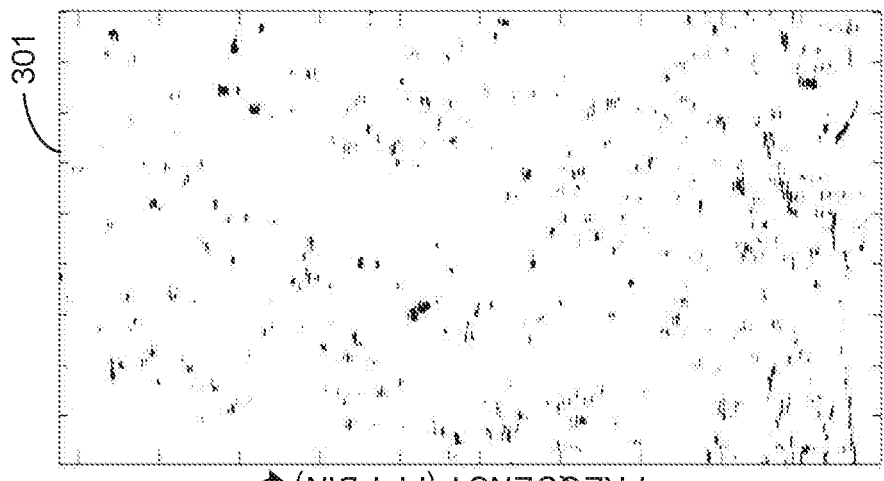
FIGS. 3A and 3B depict an example unprocessed spectrogram generated by the example signal transformer of FIG. 2.
Figure 3B:
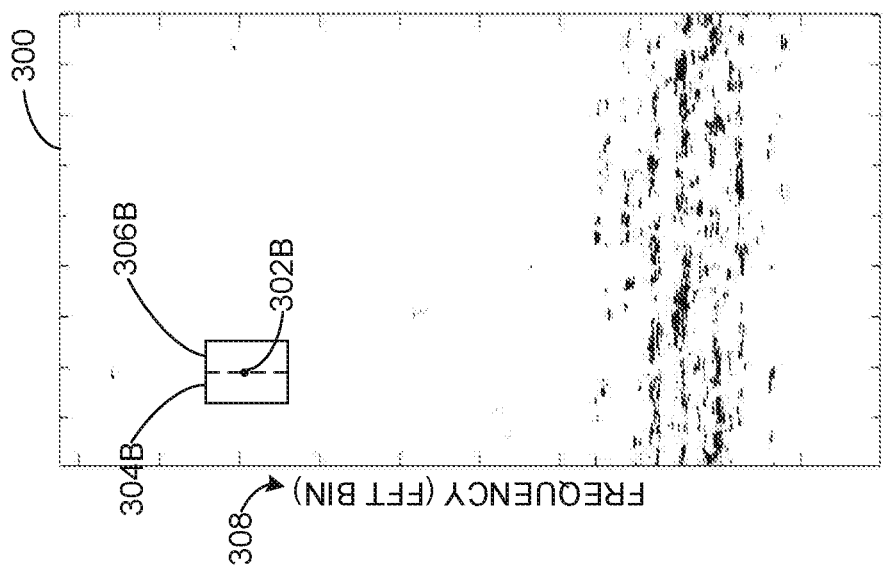

FIGS. 3A and 3B depict an example unprocessed spectrogram 300 associated with the example audio signal 106 received by the audio signal interface 202 of FIG. 2. In the illustrated examples of FIGS. 3A and 3B, each time-frequency bin of the unprocessed spectrogram 300 is normalized to generate an example normalized spectrogram 301 of FIG. 3C. In the illustrated example of FIG. 3A, the example unprocessed spectrogram 300 includes an example first time-frequency bin 302A surrounded by an example first audio region 304A and an example second audio region 306A. In the illustrated example of FIG. 3B, the example unprocessed spectrogram 300 includes an example second time-frequency bin 302B surrounded by an example third audio region 304B and an example fourth audio region 306B. The example unprocessed spectrogram 300 of FIGS. 3A and 3B and the normalized spectrogram 301 each include an example vertical axis 308 corresponding to frequency and an example horizontal axis 310 corresponding to time. In other examples, any suitable number of the time-frequency bins of the unprocessed spectrogram 300 can be normalized to generate the normalized spectrogram 301 of FIG. 3C.

The example vertical axis 308 has frequency bin units generated by a fast Fourier Transform (FFT) and has a length of 1024 FFT bins. In other examples, the example vertical axis 308 can be measured by any other suitable technique(s) of measuring frequency (e.g., Hertz, another transformation algorithm, etc.). In some examples, the vertical axis 308 encompasses the entire frequency range of the audio signal 106. In other examples, the vertical axis 308 can encompass a portion of the audio signal 106.

In the illustrated examples, the example horizontal axis 310 represents a time period of the unprocessed spectrogram 300 that has a total length of 11.5 seconds. In the illustrated example, horizontal axis 310 has sixty-four milliseconds (ms) intervals as units. In other examples, the horizontal axis 310 can be measured in any other suitable units (e.g., 1 second, etc.). For example, the horizontal axis 310 encompasses the complete duration of the audio. In other examples, the horizontal axis 310 can encompass a portion of the duration of the audio signal 106. In the illustrated example, each time-frequency bin of the spectrograms 300, 301 has a size of 64 ms by 1 FFT bin.

In the illustrated example of FIG. 3A, the first time-frequency bin 302A is associated with an intersection of a frequency bin and a time bin of the unprocessed spectrogram 300 and a portion of the audio signal 106 associated with the intersection. The example first audio region 304A includes the time-frequency bins within a pre-defined temporal distance (e.g., intervals on the horizontal axis 310, etc.) behind the first time-frequency bin 302A and the example second audio region 306A includes the time-frequency bins within a pre-defined temporal distance (e.g., intervals on the horizontal axis 310, etc.) in front of the first time-frequency bin 302A. In the illustrated example of FIG. 3A, the audio regions 304A, 306A have the same vertical length (e.g., intervals on the vertical axis 308, etc.) and the same horizontal length (e.g., intervals on the horizontal axis 310, etc.). For example, the audio characteristic determiner 210 can determine the vertical length of the audio regions 304A, 306A (e.g., the length of the audio regions 304A, 306A along the vertical axis 308, etc.) based by a set number of FFT bins (e.g., 5 bins, 11 bins, etc.). Similarly, the audio characteristic determiner 210 can determine the horizontal length of the audio regions 304A, 306A (e.g., the length of the audio regions 304A, 306A along the horizontal axis 310, etc.). In other examples, the first audio region 304A and the second audio region 306A can have different vertical lengths and/or horizontal lengths. In the illustrated example of FIG. 3A, the audio regions 304A, 306A are rectangles. Alternatively, the audio regions 304A, 306A can be any suitable size and shape and can contain any suitable combination of time-frequency bins (e.g., any suitable group of time-frequency bins, etc.) within the unprocessed spectrogram 300. In some examples, the audio regions 304A, 306A can be different sizes and/or shapes.

The example audio characteristic determiner 210 then determines an audio characteristic of time-frequency bins contained within the audio regions 304A, 306A (e.g., mean energy, average energy root-square mean energy, mean entropy, average entropy, etc.). Using the determined audio characteristic, the example bin normalizer 214 of FIG. 2 can normalize an associated value of the first time-frequency bin 302A (e.g., the energy of the first time-frequency bin 302A can be normalized by the mean energy and/or mean entropy of all time-frequency bins within the audio regions 304A, 306A).

In the illustrated example of FIG. 3B, the second time-frequency bin 302B is associated with an intersection of a frequency bin and a time bin of the unprocessed spectrogram 300 and a portion of the audio signal 106 associated with the intersection. In the illustrated example of FIG. 3B, the second time-frequency bin 302B is in the same frequency band as the first time-frequency bin 302A (e.g., the same position on the vertical axis 308, etc.). The example third audio region 304B includes the time-frequency bins within a pre-defined temporal distance (e.g., intervals on the horizontal axis 310, etc.) behind the second time-frequency bin 302B and the example fourth audio region 306B includes the time-frequency bins within a pre-defined temporal distance (e.g., intervals on the horizontal axis 310, etc.) in front of the second time-frequency bin 302B. In the illustrated example of FIG. 3B, the audio regions 304B, 306B have the same vertical length (e.g., intervals on the vertical axis 308, etc.) and the same horizontal length (e.g., intervals on the horizontal axis 310, etc.). For example, the audio characteristic determiner 210 can determine the vertical length of the audio regions 304B, 306B (e.g., the length of the audio regions 304B, 306B along the vertical axis 308, etc.) based by a set number of FFT bins (e.g., 5 bins, 11 bins, etc.). Similarly, the audio characteristic determiner 210 can determine the horizontal length of the audio regions 304B, 306B (e.g., the length of the audio regions 304B, 306B along the horizontal axis 310, etc.). In other examples, the third audio region 304B and the fourth audio region 306B can have different vertical lengths and/or horizontal lengths. In the illustrated example of FIG. 3B, the audio regions 304B, 306B are rectangles. Alternatively, the audio regions 304B, 306B can be any suitable size and shape and can contain any suitable combination of time-frequency bins (e.g., any suitable group of time-frequency bins, etc.) within the unprocessed spectrogram 300. In some examples, the audio regions 304B, 306B can be different sizes and/or shapes. In the illustrated example, the audio regions 304B, 306B have the same size and shape as the audio regions 304A, 306A. In the other examples, the audio regions 304B, 306B have a different size and shape as the audio regions 304A, 306A.

In the illustrated example of FIG. 3B, the portions of the audio signal 106 associated with the time-frequency bins within the third audio region 304B were already analyzed by the signal transformer 206 and the audio characteristic determiner 210 (e.g., during the normalization of the first time-frequency bin 302A of FIG. 3A, etc.). In some examples, the third audio region 304B overlaps with the second audio region 306A (e.g., includes some of the same time-frequency bins, etc.). In some examples, the mean calculator 212 can calculateexponential mean values corresponding to the mean audio characteristic of the time-frequency bins in the third audio region 304B and fourth audio region 306B. For example, the mean calculator 212 can calculate the exponential mean corresponding to the audio regions 304B, 306B based on previous exponential mean values (e.g., the exponential mean values associated with an audio region displayed one time bin from the audio region defined by the audio regions 304B, 306B, etc.) and the audio characteristic values of the time-frequency bins at the temporal end of the audio region 306B (e.g., the leftmost, etc.). In such examples, the memory manager 208 then deletes the data associated with the previous exponential mean values to reduce the memory usage of the audio processor 108. Using the determined exponential mean values, the example bin normalizer 214 of FIG. 2 can normalize an associated value of the second time-frequency bin 302B (e.g., the magnitude of first time-frequency bin 302A can be normalized by the mean energy/mean entropy associated with each time-frequency bin within the audio regions 304B, 306B) and each other time-frequency bin in the same time bin (e.g., audio segment, frame, etc.).

Figure 3C:
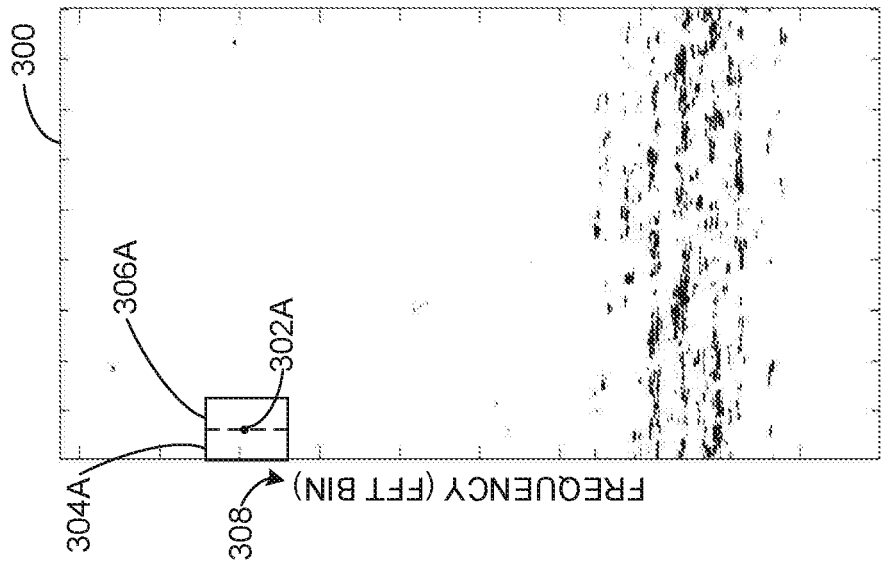
FIG. 3C depicts an example of a normalized spectrogram generated by the subfingerprint generator of FIG. 2 from the unprocessed spectrogram of FIGS. 3A and 3B.

FIG. 3C depicts an example of a normalized spectrogram 301 generated by the audio processor 108 of FIG. 2 by normalizing a plurality of the time-frequency bins of the unprocessed spectrogram 300 of FIGS. 3A-3B. For example, some or all of the time-frequency bins of the unprocessed spectrogram 300 can be normalized in a manner similar to how as the first time-frequency bin 302A and/or second time-frequency bin 302B were normalized. In such examples, the mean calculator 212 determines the mean value of previous time-frequency bins whenever possible (e.g., whenever the time-frequency bins had previously been used in a calculation, etc.). For example, time-frequency bins associated with temporal earlier portions of the audio signal 106 (e.g., the first time-frequency bin 302A) are not calculated using previous mean values because the time-frequency bins associated with region behind the time-frequency bins have not been processed by the audio processor 108 (e.g., the time-frequency bins in the audio region 304A, etc.). The resulting time-frequency bins of FIG. 3C have now been normalized by the local mean energy/mean entropy within the local area around the region. As a result, the darker regions are areas that have the most energy in their respective local areas. This allows the fingerprint to incorporate relevant audio features even in areas that are low in energy relative to the usual louder bass frequency area.

Figure 4:
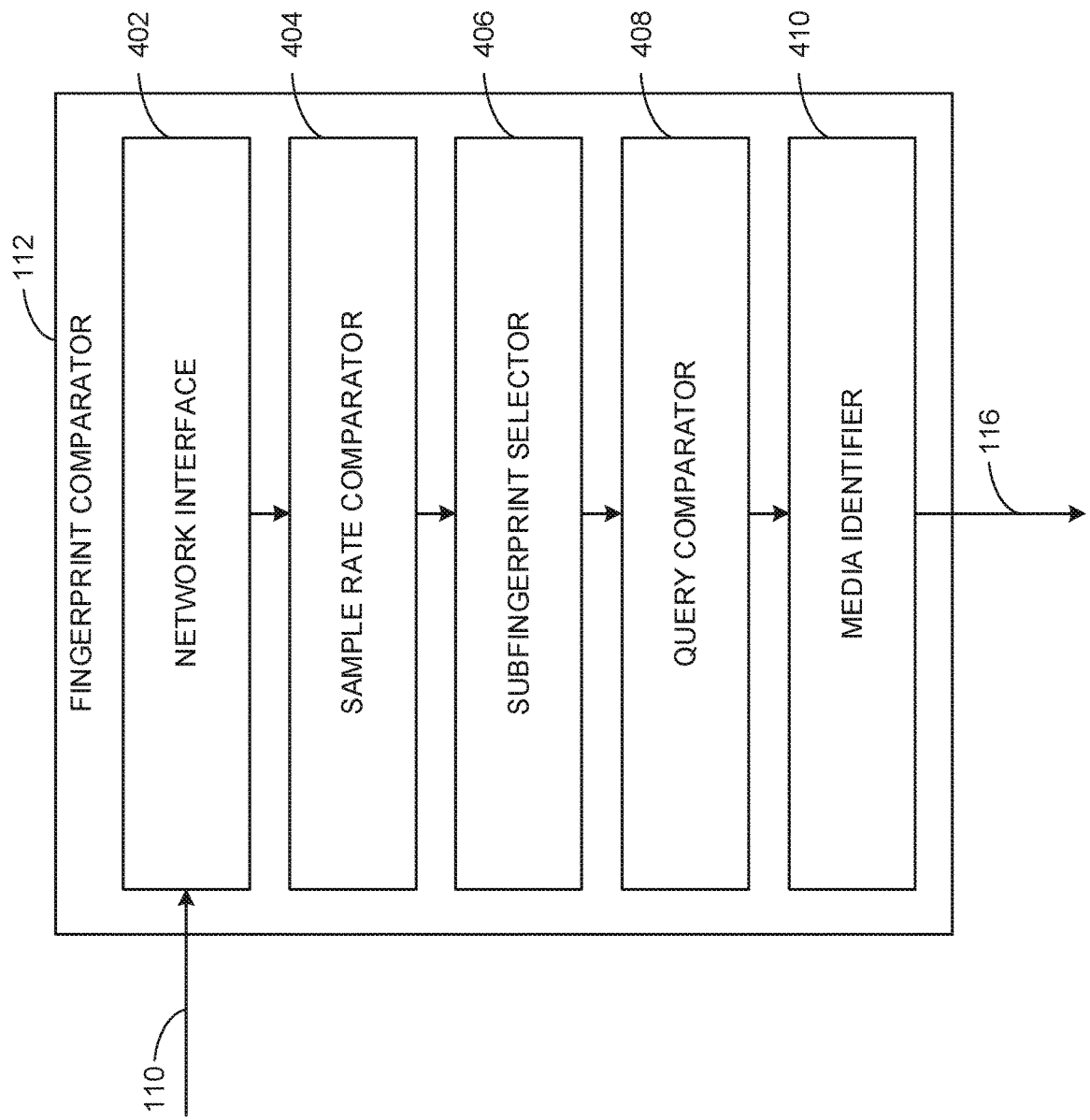
FIG. 4 is an example implementation of the fingerprint comparator of FIG. 1.

FIG. 4 is an example implementation of the fingerprint comparator 112 of FIG. 1. The example fingerprint comparator 112 includes an example network interface 402, an example sample rate comparator 404, an example subfingerprint selector 406, an example query comparator 408, and an example media identifier 410.

The example network interface 402 receives the query fingerprint 110 from the network 111. For example, the network interface 402 can allow the fingerprint comparator 112 to communicate with the audio processor 108 and/or another network-enabled device. In some examples, the network interface 402 can be implemented by a gateway, modem, and/or any other suitable device.

The example sample rate comparator 404 compares the sample rate of fingerprints. For example, the sample rate comparator 404 can compare the sample rate (e.g., the subfingerprint rate, etc.) of the query fingerprint 110 to the sample rate of a reference fingerprint in the reference fingerprint database 114. For example, the sample rate comparator 404 can determine a sample rate coefficient based on the ratio of the sample rate of the query fingerprint 110 to the sample rate of the reference fingerprint(s). For example, if the sample rate of the reference fingerprint is 64 ms and the sample rate of the query fingerprint 110 is 128 ms, the sample rate coefficient is 2. For example, if the sample rate of the reference fingerprint is 64 ms and the sample rate of the query fingerprint 110 is 384 ms, the sample rate coefficient is 6. In other examples, the example sample rate comparator 404 can determine the sample rate coefficient based on any other suitable means.

The example subfingerprint selector 406 selects subfingerprints from the reference fingerprint based on the sample rate coefficient. For example, the subfingerprint selector 406 can select subfingerprints corresponding to each subfingerprint of the query fingerprint. For example, if the sample rate coefficient is 2, the subfingerprint selector 406 can select every other subfingerprint of the reference fingerprint. For example, if the sample rate coefficient is 6, the subfingerprint selector 406 can select every sixth subfingerprint of the reference fingerprint(s). In some examples, the subfingerprint selector 406 selects a subfingerprint from a different reference fingerprint. In such examples, the subfingerprint selector 406 selects a subfingerprint from a fingerprint associated with an adjacent portion of the fingerprinted audio (e.g., a reference fingerprint associated with the same media at an adjacent time, etc.). The function of the subfingerprint selector 406 is described in greater detail below in conjunction with FIG. 5.

The example query comparator 408 compares the subfingerprints of the query fingerprints to the corresponding selected subfingerprints of the reference fingerprint(s). For example, the query comparator 408 can determine if the query fingerprint 110 matches the reference fingerprint(s). In some examples, the query comparator 408 compares the first subfingerprint of the query fingerprint 110 to subfingerprints of the reference fingerprint(s) to determine candidate reference fingerprint(s) for matching. In some examples, the query comparator 408 can determine if the comparison indicates that query fingerprint 110 matches the reference fingerprint(s). For example, the query comparator 408 can compare the fingerprints via hashing, linear matching, etc. In some examples, the query comparator 408 can generate a similarity value based on the similarity between the query fingerprint and the reference fingerprint(s). In some examples, the query comparator 408 can determine that multiple reference fingerprint(s) match the query fingerprint 110. In such examples, the query fingerprint 110 can be associated with multiple pieces of media. In some examples, the query comparator 408 can determine that the query fingerprint matches no reference fingerprint(s).

The example media identifier 410 generates the media identification report 116 based on the query comparator 408. For example, the media identifier 410 can identify one or more pieces of media (e.g., song(s), etc.) associated with the audio signal 106 used to generate the query fingerprint 110. In some examples, the media identifier 410 generates the media identification report 116 to indicate that the media associated with the query fingerprint 110 could not be identified. In some examples, the media identifier 410 can cause the media identification report 116 to be communicated to an interested-party (e.g., over the network 111, etc.).

While an example manner of implementing the example fingerprint comparator 112 of FIG. 1 is illustrated in FIG. 4, one or more of the elements, processes, and/or devices illustrated in FIG. 4 may be combined, divided, re-arranged, omitted, eliminated, and/or implemented in any other way. Further, the example network interface 402, the example sample rate comparator 404, the example subfingerprint selector 406, the example query comparator 408, the example media identifier 410, and/or, more generally, the example fingerprint comparator 112 of FIGS. 1 and 4 may be implemented by hardware, software, firmware, and/or any combination of hardware, software, and/or firmware. Thus, for example, any of the example network interface 402, the example sample rate comparator 404, the example subfingerprint selector 406, the example query comparator 408, the example media identifier 410, and/or, more generally, the example audio processor 108 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example network interface 402, the example sample rate comparator 404, the example subfingerprint selector 406, the example query comparator 408, the example media identifier 410 is/are hereby expressly defined to include a non-transitory computer readable storage device or storage disk such as a memory, a digital versatile disk (DVD), a compact disk (CD), a Blu-ray disk, etc., including the software and/or firmware. Further still, the example fingerprint comparator 112 of FIGS. 1 and 4 may include one or more elements, processes, and/or devices in addition to, or instead of, those illustrated in FIG. 4, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
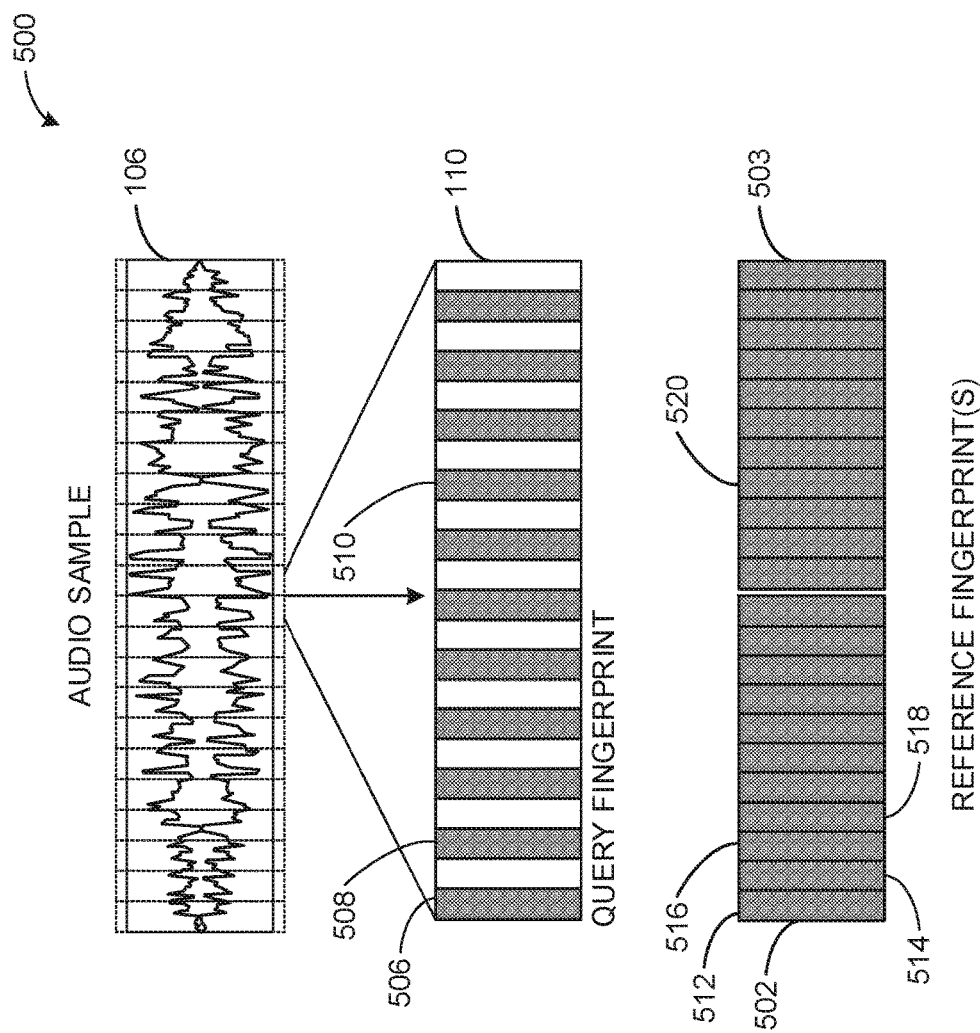
FIG. 5 is an example illustration showing the comparison of a query fingerprint and a reference fingerprint by the fingerprint comparator of FIGS. 1 and/or 4.

FIG. 5 is an example illustration showing an example comparison 500 of the query fingerprint 110 and an example first reference fingerprint 502 by the example fingerprint comparator 112. The example query fingerprint 110 and the example reference fingerprints 502, 503 are generated (e.g., by the audio processor 108 of FIGS. 1 and 2, etc.) from the audio signal 106. The example query fingerprint 110 includes an example first query subfingerprint 506, an example second query subfingerprint 508 and an example third query subfingerprint 510. The example first reference fingerprint 502 includes an example first reference subfingerprint 512, an example second reference subfingerprint 514, an example third reference subfingerprint 516 and an example fourth reference subfingerprint 518. The example second reference fingerprint 503 includes an example fifth reference subfingerprint 520.

In the illustrated example of FIG. 5, the query fingerprint 110 is generated at a first sample rate that is lower than the second sample rate the reference fingerprint(s) was generated at. That is, the subfingerprints of the query fingerprint 110 are associated with samples of the audio signal 106 taken at a first sample rate and the reference fingerprints 502, 503 are associated with samples of the taken at a second sample rate. In the illustrated example of FIG. 5, the query fingerprints 110 and the reference fingerprints 502, 503 include the same number of subfingerprints. In such examples, the query fingerprint 110 is associated with a longer portion of the audio signal 106 than the reference fingerprints 502, 503 because of the comparatively lower sample rate (e.g., the query fingerprint 110 must encompass a greater portion of the audio signal 106 to include the same number of subfingerprints, etc.). In the illustrated example of FIG. 5, to compare each subfingerprint (e.g., the subfingerprints 506, 508, 510, etc.) of the query fingerprint 110, subfingerprints from multiple reference fingerprints must be selected by the subfingerprint selector 406 to ensure subfingerprints corresponding to the same portion of the audio signal 106 are compared.

In the illustrated example of FIG. 5, the sample rate comparator 404 can compare the sample rate of the query fingerprint 110 and the reference fingerprints 502, 503 to determine a sample rate coefficient of "2" (e.g. the query fingerprint 110 has a sample rate of 128 ms and the reference fingerprints 502, 503 have a sample rate of 64 ms, etc.). The subfingerprint selector 406 can select every other subfingerprint from the reference fingerprint 502, 503 to compare the subfingerprints of the query fingerprint 110. For example, the subfingerprint selector 406 selects the first reference subfingerprint 512 to compare to the first query subfingerprint 506 and the third reference subfingerprint 516 to compare to the second query subfingerprint 508. In the illustrated example of FIG. 5, the reference fingerprint 502 does not contain a sample corresponding to the same portion of the audio signal 106 as the third query subfingerprint 510. In this example, the subfingerprint selector 406 selects the fifth reference subfingerprint 520 from the second reference fingerprint 503. In the illustrated example of FIG. 5, the subfingerprint selector 406 does not select the second reference subfingerprint 514 and the fourth reference subfingerprint 518 as the reference subfingerprints 514, 518 do not correspond to the portions of the audio signal 106 fingerprinted by the query fingerprint 110.

Figure 6:
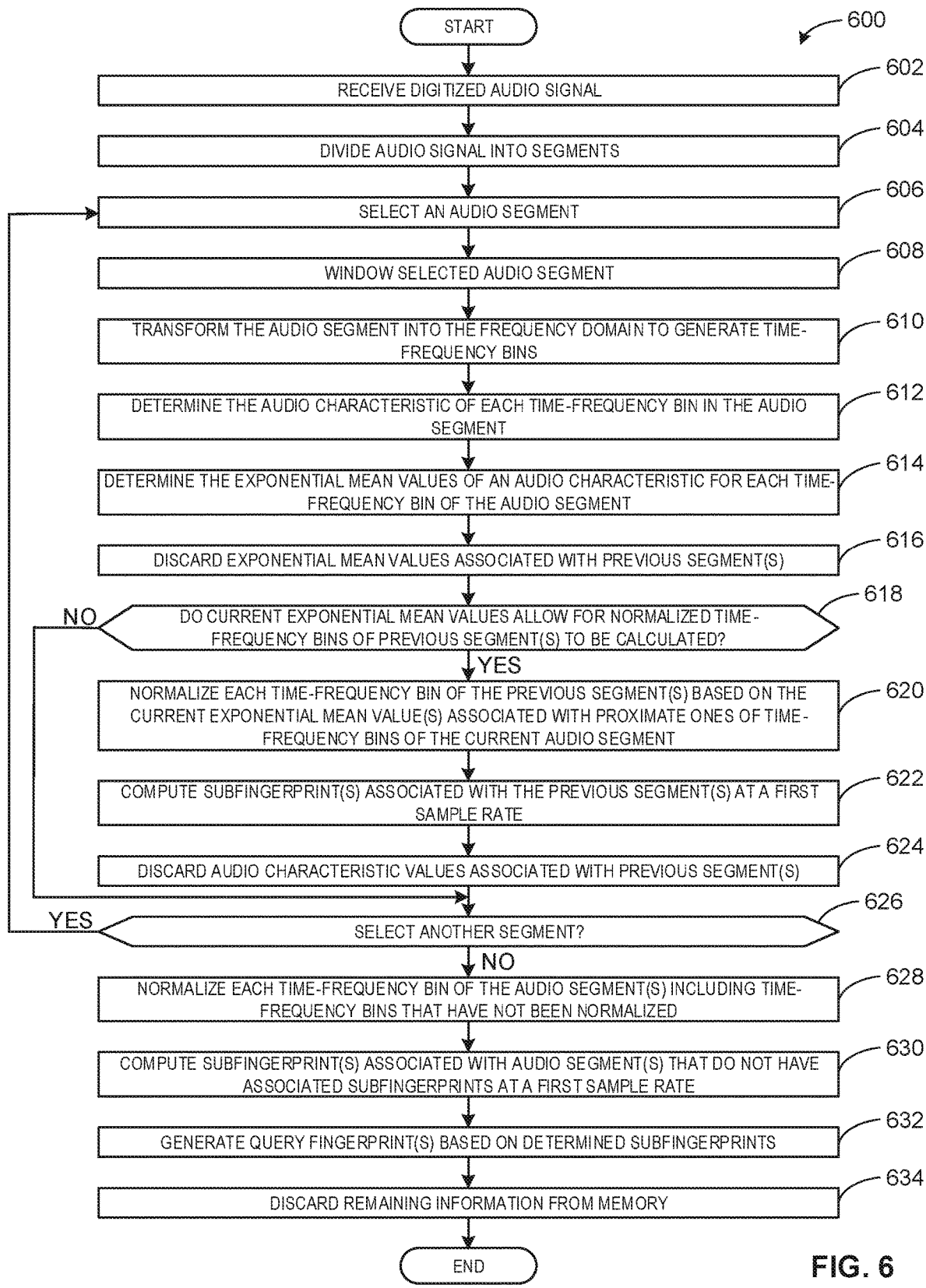
FIG. 6 is a flowchart representative of machine-readable instructions that may be executed to implement the audio processor of FIGS. 1 and/or 2.

A flowchart representative of example hardware logic, machine readable instructions, hardware implemented state machines, and/or any combination thereof for implementing the audio processor 108 of FIG. 2 is shown in FIG. 6. The machine readable instructions may be an executable program or portion of an executable program for execution by a computer processor such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example programs are described with reference to the flowchart illustrated in FIG. 6, many other methods of implementing the example audio processor 108 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

Figure 7:
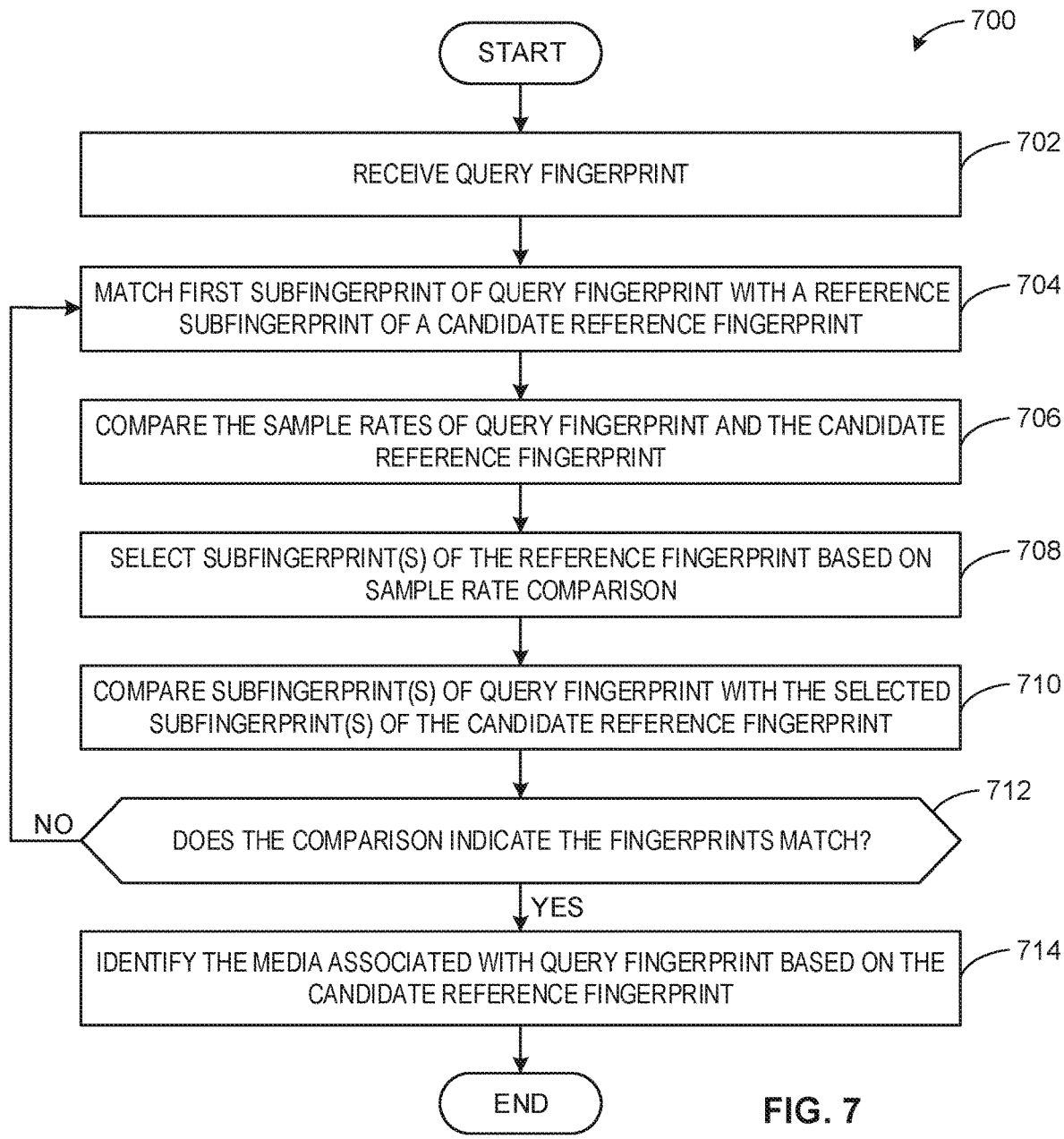
FIG. 7 is a flowchart representative of machine-readable instructions that may be executed to implement the fingerprint comparator of FIGS. 1 and 4.

A flowchart representative of example hardware logic, machine readable instructions, hardware implemented state machines, and/or any combination thereof for implementing the fingerprint comparator 112 of FIG. 3 is shown in FIG. 7. The machine readable instructions may be an executable program or portion of an executable program for execution by a computer processor such as the processor 912 shown in the example processor platform 900 discussed below in connection with FIG. 9. The program may be embodied in software stored on a non-transitory computer readable storage medium such as a CD-ROM, a floppy disk, a hard drive, a DVD, a Blu-ray disk, or a memory associated with the processor 912, but the entire program and/or parts thereof could alternatively be executed by a device other than the processor 912 and/or embodied in firmware or dedicated hardware. Further, although the example programs are described with reference to the flowchart illustrated in FIG. 7, many other methods of implementing the example fingerprint comparator 112 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 6 and 7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

The process of FIG. 6 begins at block 602. At block 602, the audio processor 108 receives the digitized audio signal 106. For example, the audio processor 108 can receive audio (e.g., emitted by the audio source 102 of FIG. 1, etc.) captured by the microphone 104. In this example, the microphone can include an analog to digital converter to convert the audio into a digitized audio signal 106. In other examples, the audio processor 108 can receive audio stored in a database (e.g., the volatile memory 814 of FIG. 8, the non-volatile memory 816 of FIG. 9, the mass storage 828 of FIG. 8, etc.). In other examples, the digitized audio signal 106 can transmitted to the audio processor 108 over a network 111. Additionally or alternatively, the audio processor 108 can receive the audio signal 106 by any other suitable means.

At block 604, the audio segmenter 204 divides the audio signal 106 into audio segments. For example, the audio segmenter 204 can divide the audio signal 106 into temporal segments corresponding to a length of the audio signal 106 associated with a sample (e.g., the period of the audio signal 106 corresponding to a subfingerprint, etc.). In some examples, the audio segmenter 204 can segment the audio signal 106 into audio segments into corresponding to the length of a time bin (e.g., a frame, etc.).

At block 606, the audio segmenter 204 selects an audio segment. For example, the audio segmenter 204 can select a first audio segment (e.g., the audio segment corresponding to the beginning of the audio signal 106, etc.). In some examples, the audio segmenter 204 can select an audio segment temporally immediately adjacent to a previously selected audio segment. In other examples, the audio segmenter 204 can select an audio segment based on any suitable characteristic.

At block 608, the audio segmenter 204 windows the selected audio segment. For example, the audio segmenter performs a windowing function (e.g., a Hamming function, a Hann function, etc.). In other examples, the audio segmenter 204 can window the selected audio segment by any other suitable method.

At block 610, the signal transformer 206 transforms the audio signal 106 corresponding to the selected audio segment to generate time-frequency bins. For example, the signal transformer 206 can transform the portion of the audio signal 106 corresponding to the audio segment using a Fast Fourier Transform (FFT). In other examples, the signal transformer 206 can use any other suitable means of transforming the audio signal 106 (e.g., discrete Fourier transform, a sliding time window Fourier transform, a wavelet transform, a discrete Hadamard transform, a discrete Walsh Hadamard, a discrete cosine transform, etc.). In some examples, the time-frequency bins generated by the signal transformer 206 and corresponding to the selected audio segment are associated with the intersection of each frequency bin of the audio signal 106 and the time bin(s) associated with the audio segment. In some examples, each time-frequency bin generated by the audio segmenter 204 has an associated magnitude value (e.g., a magnitude of the FFT coefficient of the audio signal 106 associated with that time-frequency bin, etc.).

At block 612, the audio characteristic determiner 210 determines the audio characteristic of each time-frequency bin. For example, the audio characteristic determiner 210 can determine the magnitude of each time-frequency bin in the audio segment. In such examples, the audio characteristic determiner 210 can calculate the energy and/or the entropy associated with each time-frequency bin. In other examples, the audio characteristic determiner 210 can determine any other suitable audio characteristic(s) (e.g., amplitude, power, etc.).

At block 614, the mean calculator 212 calculates the exponential mean values for each time-frequency bin of the audio segment. For example, the mean calculator 212 can calculate the exponential mean values for each time-frequency bin using Equation (1). In some examples, if the audio segment is the first audio segment of the audio signal 106, the mean calculator 212 can set the exponential mean value based on the empirically determined weighting coefficient of Equation (1) and the audio characteristic value of the respective time-frequency bin. In other examples, the mean calculator 212 can determine the exponential mean values for each time-frequency bin of the audio segment based on any other suitable method.

At block 616, the memory manager 208 discards the exponential mean values associated with the previous audio segment(s). For example, the memory manager 208 can discard the exponential mean values associated with the time-frequency bins of the previous adjacent audio segment after the previous exponential mean value(s) have been used to calculate exponential mean values associated with the current segment.

At block 618, the memory manager 208 determines if the current exponential mean values allow for normalized time-frequency bins of a previous segment to be calculated. For example, the memory manager 208 can determine if audio characteristic values for time-frequency bins corresponding to the temporal length of the audio region 306A are stored in memory (e.g., a time bin displaced 22 bins back from the current time bin, etc.). In such examples, the exponential mean values calculated by the mean calculator 212 allow the normalized time-frequency bins of the previous segment to be calculated (e.g., the time-frequency bin 302A can be normalized after the time-frequency bins of the audio segments corresponding to the audio region 306A have been incorporated into the exponential mean value(s), etc.) In some examples, audio segments at the beginning of the audio signal 106 do not allow the time-frequency bins of one or more previous segment(s) to be normalized (e.g., the exponential mean value(s) of the current audio segment do not correspond to the left-most edge of the audio region 306A, etc.). If the memory manager 208 determines that the current exponential mean values allow the time-frequency bins of a previous segment to be normalized, the process 600 advances to block 620. If the memory manager 208 determines that the current exponential mean values do not allow the time-frequency bins of a previous segment to be normalized, the process 600 returns to block 606.

At block 620, the bin normalizer 214 normalizes each time-frequency bin of the previous segment(s) based on the current exponential mean value(s) associated with proximate ones of the time-frequency bins of the current audio segment. For example, the bin normalizer 214 can normalize a time-frequency bin of a previous segment based on the exponential mean values associated with time-frequency bins of the current audio segment within an audio region. For example, the bin normalizer 214 can normalize the time-frequency bin 302A based on the mean exponential values corresponding to the audio region 304A, 306A (e.g., the current exponential mean value(s) of the time-frequency bins along the left-most edge of the audio region 306A, etc.). In some examples, the exponential mean value(s) used to normalize each time-frequency bin are an estimate of the average audio characteristic of a first audio region (e.g., the first audio region 304A, the third audio region 304B, etc.) and the second audio region (e.g., the second audio region 306A, the fourth audio region 306B, etc.).

At block 622, the subfingerprint generator 216 computes the subfingerprint(s) associated with the previous audio segment(s). For example, the subfingerprint generator 216 can generate a subfingerprint based on the normalized values of the time-frequency bins of the previous segment(s) analyzed at block 620. In some examples, the subfingerprint generator 216 generates a subfingerprint by selecting energy and/or entropy extrema (e.g., five extrema, 20 extrema, etc.) in the previous segment(s). In some examples, the subfingerprint generator 216 does not generate a subfingerprint (e.g., the previous audio segment is not being used to subfingerprint due to down-sampling, etc.).

At block 624, the memory manager 208 discards the audio characteristic values associated with the previous segment(s). For example, the memory manager 208 can discard the information determined during the execution of block 612 corresponding to the time-frequency bins of the previous segment(s) analyzed during the execution of blocks 620, 622. In other examples, the memory manager 208 can discard any other unneeded information.

At block 626, the audio segmenter 204 can determine if another audio segment is to be selected. In some examples, the audio segmenter 204 selects another audio segment of the audio signal 106 until every audio segment has been selected. If the audio segmenter 204 determines another time-frequency bin is to be selected, the process 600 returns to block 606. If the audio characteristic determiner 210 determines another time-frequency bin is not to be selected, the process 600 advances to block 628.

At block 628, the bin normalizer 214 normalizes each time-frequency bin of the audio segment(s) including time-frequency bins that have not been normalized. For example, the bin normalizer 214 can normalize the time-frequency bins of the remaining audio segments of the audio signal 106 (e.g., the audio segments corresponding to the end of the audio signal 106, etc.) using the exponential mean value(s) associated with the time-frequency bins of the last audio segment. For example, the bin normalizer 214 can normalize each remaining time-frequency bin based on the exponential value(s) associated with adjacent ones of the time-frequency bins of the last audio segment. In other examples, the bin normalizer 214 can normalize the remaining time-frequency bins based on any other suitable means.

At block 630, the subfingerprint generator 216 computes the subfingerprint(s) associated with the audio segment(s) that do not have associated subfingerprints at a first sample rate. For example, the subfingerprint generator 216 can generate a subfingerprint based on the normalized values of the time-frequency bins of the audio segments analyzed at block 628. In some examples, the subfingerprint generator 216 generates a subfingerprint by selecting energy and/or entropy extrema (e.g., five extrema, 20 extrema, etc.) in the previous segment(s). In some examples, the subfingerprint generator 216 do not generate a subfingerprint (e.g., the previous audio segment is not being used to subfingerprint due to down-sampling, etc.).

At block 632, the fingerprint generator 218 generates a fingerprint (e.g., the query fingerprint 110 of FIG. 1) of the audio signal 106 based on the generated subfingerprints. For example, the fingerprint generator 218 can concatenate the generated subfingerprints into the query fingerprint 110. In some examples, the fingerprint generator 218 can utilize any suitable means (e.g., an algorithm, etc.) to generate the query fingerprint 110 representative of the audio signal 106. Once the example query fingerprint(s) 110 has been generated, the process 600 ends.

At block 634, the memory manager 208 discards all remaining information from memory. For example, the memory manager 208 can discard the remaining exponential mean values, audio characteristic values and normalized bin values from memory. In other examples, the memory manager 208 can discard any or all of the information stored in memory.

The process of FIG. 7 begins at block 702. At block 702, the network interface 402 receives the query fingerprint 110. For example, the network interface 402 can interface with the network 111 to receive the query fingerprint 110. In some examples, the network interface can directly communicate with the audio processor 108 to receive the query fingerprint.

At block 704, the example query comparator 408 compares the first subfingerprint of the query fingerprint 110 with a reference subfingerprint of a candidate reference fingerprint. For example, the example query comparator 408 can hash the first subfingerprint to identify a matching subfingerprint of a reference fingerprint in the reference fingerprint database 114. In other examples, the query comparator 408 can match a first subfingerprint of the query fingerprint 110 by any other suitable means.

At block 706, the example sample rate comparator 404 compares the sample rate of the query fingerprint 110 and the candidate reference fingerprint. For example, the sample rate comparator 404 can compare the sample rate (e.g., the subfingerprint rate, etc.) of the query fingerprint 110 to the sample rate (e.g., the subfingerprint rate, etc.) of the candidate reference fingerprint. In some examples, the sample rate comparator 404 can determine a sample rate coefficient based on the ratio of the sample rate of the query fingerprint 110 to the sample rate of the reference fingerprint(s). In other examples, the example sample rate comparator 404 can determine the sample rate coefficient based on any other suitable means.

At block 708, the example subfingerprint selector 406 selects subfingerprints of the reference fingerprint based on the sample rate coefficient. For example, the subfingerprint selector 406 can select subfingerprints of the candidate reference fingerprint corresponding to each subfingerprint of the query reference fingerprint. For example, if the sample rate coefficient is "2," the subfingerprint selector 406 can select every other subfingerprint of the candidate reference fingerprint(s). For example, if the sample rate coefficient is "6," the subfingerprint selector 406 can select every sixth subfingerprint of the candidate reference fingerprint(s).

At block 710, the example query comparator 408 compares the subfingerprints of the query fingerprint 110 with the selected subfingerprints(s) with the selected subfingerprint(s) of the candidate reference fingerprint. For example, the query comparator 408 can compare the subfingerprints using hash matching, linear matching and/or any other suitable fingerprint matching techniques. In some examples, the query comparator 408 determines a similarity value associated with the comparison, which indicates the similarity between the query fingerprint 110 and the candidate reference fingerprint(s).

At block 712, the query comparator 408 determines if the comparison indicates the fingerprints match. For example, the query comparator 408 can determine if the similarity value satisfies a matching threshold. If the similarity value satisfies the matching threshold, the query comparator 408 determines the fingerprint matches and the process 700 advances to block 714. If the similarity value does not satisfy the matching threshold, the query comparator 408 determines the fingerprint matches and the process 700 returns to block 704.

At block 714, the media identifier 410 identifies the media associated with the query fingerprint 110 based on the candidate reference fingerprint. For example, the media identifier 410 can generate the media identification report 116 based on the media (e.g., the song(s), etc.) associated with the candidate reference fingerprint in the reference fingerprint database 114. For example, the media identifier 410 can generate the media identification report 116 by reporting that no matches were found among the reference fingerprint database 114. I In other examples, the media identifier 410 can identify the media associated with the query fingerprint by any other suitable means. The process 700 then ends.

Figure 8:
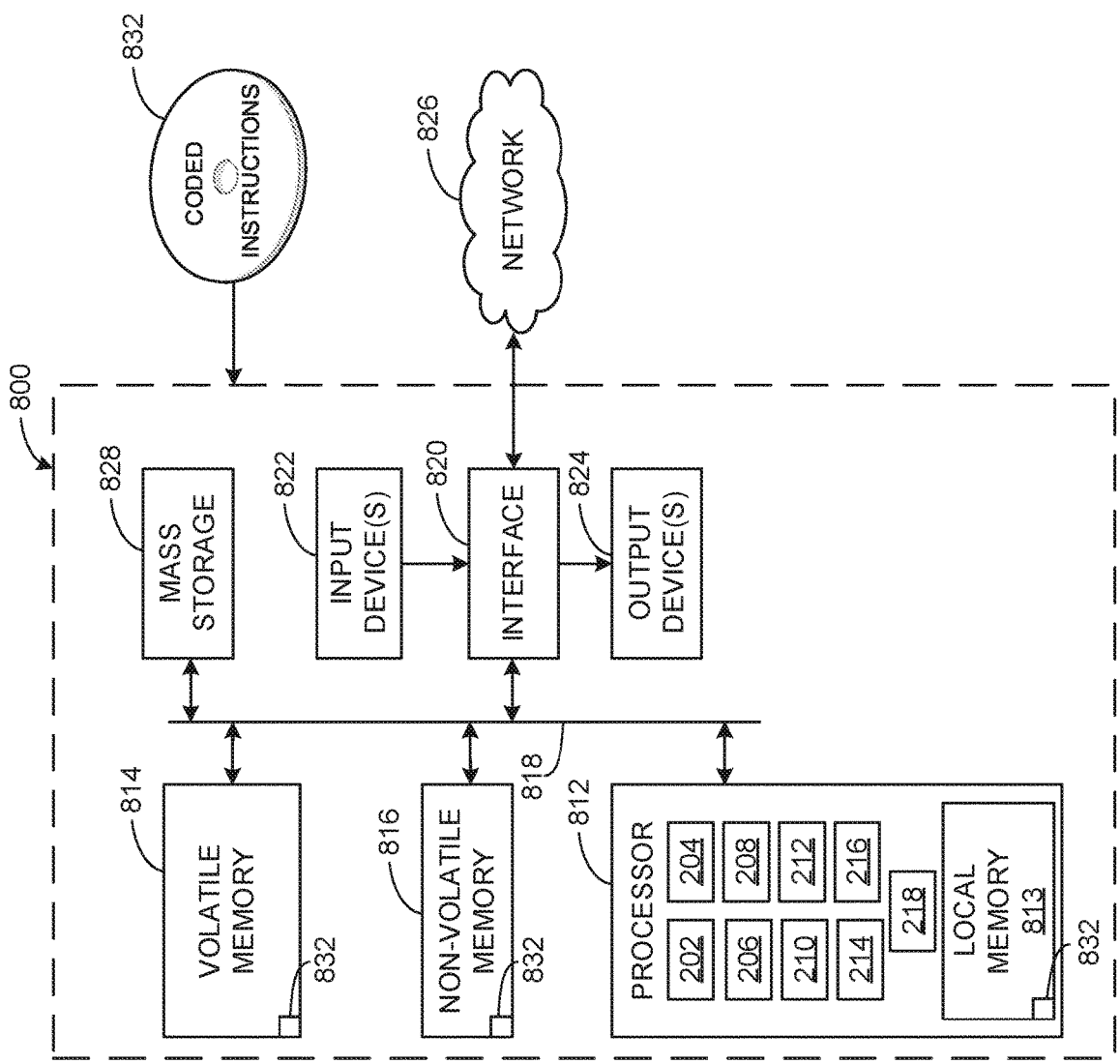
FIG. 8 is a block diagram of an example processing platform structured to execute the instructions of FIG. 6 to implement the audio processor of FIGS. 1 and/or 2.

FIG. 8 is a block diagram of an example processor platform 800 structured to execute the instructions of FIG. 6 to implement the audio processor 108 of FIG. 2. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 812 implements the example audio segmenter 204, the example signal transformer 206, the example memory manager 208, the example audio characteristic determiner 210, the example mean calculator 212, the example bin normalizer 214, the example subfingerprint generator 216 and the example fingerprint generator 218.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®), and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) 822 can be implemented by, for example, an audio sensor, a microphone, a camera (still or video), and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer, and/or speaker. The interface circuit 820 of the illustrated example, thus, typically includes a graphics driver card, a graphics driver chip, and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 to implement the methods of FIG. 6 may be stored in the mass storage device 828, in the volatile memory 814, in the non-volatile memory 816, and/or on a removable non-transitory computer readable storage medium such as a CD or DVD.

Figure 9:
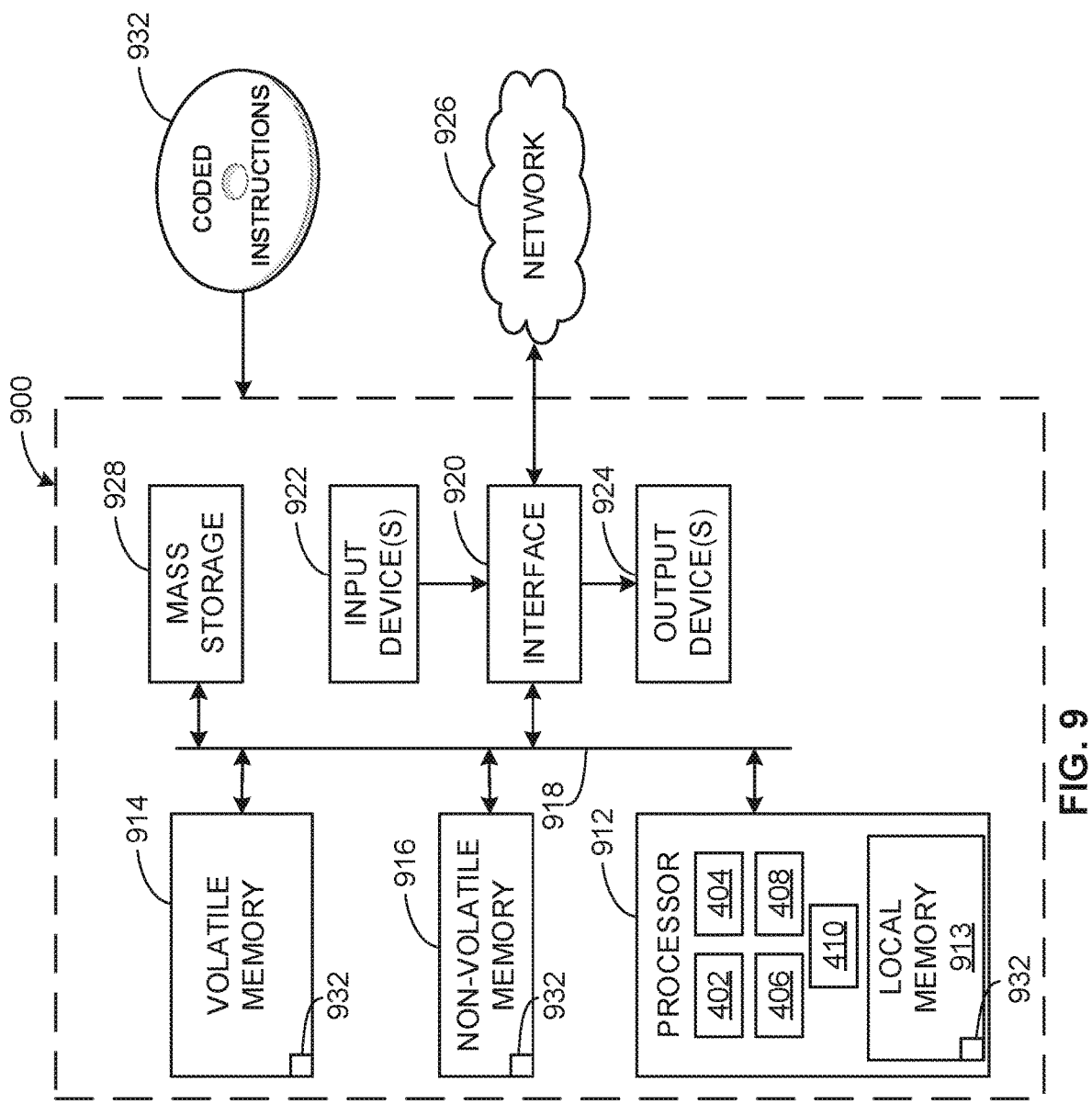
FIG. 9 is a block diagram of an example processing platform structured to execute the instructions of FIG. 7 to implement the fingerprint comparator of FIGS. 1 and/or 4.

FIG. 9 is a block diagram of an example processor platform 900 structured to execute the instructions of FIG. 7 to implement the fingerprint comparator 112 of FIG. 2. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 912 implements the example network interface 402, the example sample rate comparator 404, the example subfingerprint selector 406, the example query comparator 408, and the example media identifier 410.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®), and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) 922 can be implemented by, for example, an audio sensor, a microphone, a camera (still or video), and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer, and/or speaker. The interface circuit 920 of the illustrated example, thus, typically includes a graphics driver card, a graphics driver chip, and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 to implement the methods of FIG. 6 may be stored in the mass storage device 928, in the volatile memory 914, in the non-volatile memory 916, and/or on a removable non-transitory computer readable storage medium such as a CD or DVD.

From the foregoing, it will be appreciated that example methods and apparatus have been disclosed that allow fingerprints of audio signal to be created that reduces the amount noise captured in the fingerprint. Additionally, by sampling audio from less energetic regions of the audio signal, more robust audio fingerprints are created when compared to previous used audio fingerprinting methods.

Example methods, apparatus, systems, and articles of manufacture to fingerprint an audio signal via exponential normalization are disclosed herein. Further examples and combinations thereof include the following: Example 1 includes an apparatus, comprising an audio segmenter to divide an audio signal into a plurality of audio segments including a first audio segment and a second audio segment, the first audio segment including a first time-frequency bin, the second audio segment including a second time-frequency bin, a mean calculator to determine a first exponential mean value associated with the first time frequency bin based on a first magnitude of the audio signal associated with the first time frequency bin, and a second exponential mean value associated with the second time frequency bin based on a second magnitude of the audio signal associated with the second time frequency bin and the first exponential mean value, a bin normalizer to normalize the first time-frequency bin based on the second exponential mean value, and a fingerprint generator to generate a fingerprint of the audio signal based on the normalized first time-frequency bins.

Example 2 includes the apparatus of example 1, wherein the first time-frequency bin and the second time-frequency bin are in a same frequency band of the audio signal.

Example 3 includes the apparatus of example 1, wherein the bin normalizer is further to normalize the first time-frequency bin based a third exponential mean value associated with a third time-frequency bin, the third time-frequency bin in the second audio segment and proximate to the second time-frequency bin.

Example 4 includes the apparatus of example 1, further including memory, a signal transformer to transform the first audio segment into a frequency domain to thereby generate a first group of time-frequency bins including the first time-frequency bin, transform the second audio segment into the frequency domain to thereby generate a second group of time-frequency bins including the second time-frequency bin, and a memory manager to, after the second exponential mean value is determined, discard the first group of time-frequency bins from the memory.

Example 5 includes the apparatus of example 4, wherein the memory manager is further to, after mean calculator determines the second exponential mean value, discard the first exponential mean value from the memory.

Example 6 includes the apparatus of example 4, wherein each time-frequency bin of the first group of time-frequency bins is a unique combination of (1) a time period of the audio signal and (2) a frequency band of the audio signal.

Example 7 includes the apparatus of example 1, further including a subfingerprint generate to a subfingerprint by selecting energy extrema associated the first audio segment, the fingerprint including the subfingerprint.

Example 8 includes a method comprising, dividing an audio signal into a plurality of audio segments including a first audio segment and a second audio segment, the first audio segment including a first time-frequency bin, the second audio segment including a second time-frequency bin, determining a first exponential mean value associated with the first time frequency bin based on a first magnitude of the audio signal associated with the first time frequency bin, determining a second exponential mean value associated with the second time frequency bin based on a second magnitude of the audio signal associated with the second time frequency bin and the first exponential mean value, normalizing the first time-frequency bin based on the second exponential mean value, and generating a fingerprint of the audio signal based on the normalized first time-frequency bins.

Example 9 includes the method of example 8, wherein the first time-frequency bin and the second time-frequency bin are in a same frequency band of the audio signal.

Example 10 includes the method of example 8, wherein the normalization of the first time-frequency bin is further based a third exponential mean value associated with a third time-frequency bin, the third time-frequency bin in the second audio segment and proximate to the second time-frequency bin.

Example 11 includes the method of example 8, further including transforming the first audio segment into a frequency domain to thereby generate a first group of time-frequency bins including the first time-frequency bin, transforming the second audio segment into the frequency domain to thereby generate a second group of time-frequency bins including the second time-frequency bin, and discarding the first group of time-frequency bins in response to determination of the normalized the first time-frequency bin.

Example 12 includes the method of example 11, wherein each time-frequency bin of the first group of time-frequency bins is a unique combination of (1) a time period of the audio signal and (2) a frequency band of the audio signal.

Example 13 includes the method of example 8, further including discarding the first exponential mean value in response to the determination of the second exponential mean value.

Example 14 includes the method of example 10, further including generating a subfingerprint by selecting energy extrema associated the first audio segment, the fingerprint including the subfingerprint.

Example 15 includes a non-transitory computer readable medium comprising instructions, which when executed, cause a processor to divide an audio signal into a plurality of audio segments including a first audio segment and a second audio segment, the first audio segment including a first time-frequency bin, the second audio segment including a second time-frequency bin, determine a first exponential mean value associated with the first time frequency bin based on a first magnitude of the audio signal associated with the first time frequency bin, determine a second exponential mean value associated with the second time frequency bin based on a second magnitude of the audio signal associated with the second time frequency bin and the first exponential mean value, normalize the first time-frequency bin based on the second exponential mean value, and generate a fingerprint of the audio signal based on the normalized first time-frequency bins.

Example 16 includes the non-transitory computer readable medium of example 15, wherein the first time-frequency bin and the second time-frequency bin are in a same frequency band of the audio signal.

Example 17 includes the non-transitory computer readable medium of example 15, wherein the normalization of the first time-frequency bin is further based a third exponential mean value associated with a third time-frequency bin, the third time-frequency bin in the second audio segment and proximate to the second time-frequency bin.

Example 18 includes the non-transitory computer readable medium of example 15, wherein the instructions further cause the processor to transform the first audio segment into a frequency domain to thereby generate a first group of time-frequency bins including the first time-frequency bin, transform the second audio segment into the frequency domain to thereby generate a second group of time-frequency bins including the second time-frequency bin, and discard the first group of time-frequency bins in response to determination of the normalized the first time-frequency bin.

Example 19 includes the non-transitory computer readable medium of example 15, wherein the instructions further cause the processor to discard the first exponential mean value in response to the determination of the second exponential mean value.

Example 20 includes the non-transitory computer readable medium of example 15, wherein the instructions further cause the processor to generate a subfingerprint by selecting energy extrema associated the first audio segment, the fingerprint including the subfingerprint.

Although certain example methods, apparatus, and articles of manufacture have been disclosed herein, the scope of coverage of this patent is not limited thereto. On the contrary, this patent covers all methods, apparatus, and articles of manufacture fairly falling within the scope of the claims of this patent.

What is claimed is:

1. An apparatus, comprising:
    signal transformer circuitry to transform an audio signal into a frequency domain including a plurality of time-frequency bins, wherein each of the time-frequency bins corresponds to an intersection of a frequency bin and a time bin and contains a portion of the audio signal;
    audio segmenter circuitry to divide the audio signal into a plurality of audio segments including a first audio segment and a second audio segment, the first audio segment including a second group of time-frequency bins having a first time-frequency bin, the second audio segment including a first group of time-frequency bins having a second time-frequency bin;
    mean calculator circuitry to determine:
        a first exponential mean value associated with the first time-frequency bin based on a first magnitude of the audio signal associated with the first time-frequency bin; and
        a second exponential mean value associated with the second time-frequency bin based on a second magnitude of the audio signal associated with the second time-frequency bin and the first exponential mean value;
    bin normalizer circuitry to normalize the first time-frequency bin based on the second exponential mean value;
    fingerprint generator circuitry to generate a fingerprint of the audio signal based on normalized time-frequency bins, wherein the normalized time-frequency bins include the normalized first time-frequency bin;
    subfingerprint circuitry to generate a subfingerprint by selecting energy extrema of the normalized time-frequency bins, wherein selecting the energy extrema comprises selecting a group of the normalized time-frequency bins with the highest normalized energy values, and the fingerprint including the subfingerprint; and
    memory manager circuitry to, after the second exponential mean value is determined, discard the first group of the time-frequency bins from memory.

2. The apparatus of claim 1, wherein the first time-frequency bin and the second time-frequency bin are in a same frequency band of the audio signal.

3. The apparatus of claim 1, wherein the bin normalizer circuitry is further to normalize the first time-frequency bin based a third exponential mean value associated with a third time-frequency bin, the third time-frequency bin in the second audio segment and proximate to the second time-frequency bin.

4. The apparatus of claim 1, wherein the memory manager circuitry is further to, after the mean calculator circuitry determines the second exponential mean value, discard the first exponential mean value from the memory.

5. The apparatus of claim 1, wherein each time-frequency bin of the first group of time-frequency bins is a unique combination of (1) a time period of the audio signal and (2) a frequency band of the audio signal.

6. A method comprising:
    transforming, via at least one processor, an audio signal into a frequency domain including a plurality of time-frequency bins, each of the time-frequency bins corresponding to an intersection of a frequency bin and a time bin and contains a portion of the audio signal;
    dividing, via at least one processor, the audio signal into a plurality of audio segments, each audio segment including a plurality of time-frequency bins;
    determining, via at least one processor, a first audio segment having a first group of time-frequency bins including a first time-frequency bin;
    determining, via at least one processor, a first exponential mean value associated with the first time-frequency bin based on a first magnitude of the audio signal associated with the first time-frequency bin;
    determining, via at least one processor, a second audio segment having a second group of time-frequency bins including a second time-frequency bin;
    determining, via at least one processor, a second exponential mean value associated with the second time frequency bin based on a second magnitude of the audio signal associated with the second time frequency bin and the first exponential mean value;
    normalizing, via at least one processor, the first time-frequency bin based on the second exponential mean value;
    generating, via at least one processor, a fingerprint of the audio signal based on normalized time-frequency bins, wherein the normalized time-frequency bins include the normalized first time-frequency bin;
    generating, via at least one processor, a subfingerprint by selecting energy extrema of the normalized time-frequency bins, wherein selecting the energy extrema comprises selecting a group of the normalized time-frequency bins with the highest normalized energy values, and the fingerprint including the subfingerprint; and
    discarding, via at least one processor, from memory the first group of time-frequency bins in response to determination of the normalized the first time-frequency bin.

7. The method of claim 6, wherein the first time-frequency bin and the second time-frequency bin are in a same frequency band of the audio signal.

8. The method of claim 6, wherein the normalization of the first time-frequency bin is further based a third exponential mean value associated with a third time-frequency bin, the third time-frequency bin in the second audio segment and proximate to the second time-frequency bin.

9. The method of claim 6, wherein each time-frequency bin of the first group of time-frequency bins is a unique combination of (1) a time period of the audio signal and (2) a frequency band of the audio signal.

10. The method of claim 6, further comprising discarding the first exponential mean value in response to the determination of the second exponential mean value.

11. A non-transitory computer readable medium comprising instructions, which when executed, cause a processor to:
  transform an audio signal into a frequency domain including a plurality of time-frequency bins, each of the time-frequency bins corresponding to an intersection of a frequency bin and a time bin and contains a portion of the audio signal;
  determine a first audio segment having a first group of time-frequency bins including a first time-frequency bin;
  determine a first exponential mean value associated with the first time-frequency bin based on a first magnitude of the audio signal associated with the first time-frequency bin;
  determine a second audio segment having a second group of time-frequency bins including a second time-frequency bin;
  determine a second exponential mean value associated with the second time-frequency bin based on a second magnitude of the audio signal associated with the second time-frequency bin and the first exponential mean value;
  normalize the first time-frequency bin based on the second exponential mean value;
  generate a fingerprint of the audio signal based on normalized time-frequency bins, wherein the normalized time-frequency bins include the normalized first time-frequency bin;
  generate a subfingerprint by selecting energy extrema of the normalized time-frequency bins, wherein selecting the energy extrema comprises selecting a group of the normalized time-frequency bins with the highest normalized energy values, and the fingerprint including the subfingerprint; and
  discard from memory the first group of time-frequency bins in response to determination of the normalized first time-frequency bin.

12. The non-transitory computer readable medium of claim 11, wherein the first time-frequency bin and the second time-frequency bin are in a same frequency band of the audio signal.

13. The non-transitory computer readable medium of claim 11, wherein the normalization of the first time-frequency bin is further based a third exponential mean value associated with a third time-frequency bin, the third time-frequency bin in the second audio segment and proximate to the second time-frequency bin.

14. The non-transitory computer readable medium of claim 11, wherein the instructions further cause the processor to discard the first exponential mean value in response to the determination of the second exponential mean value.

* * * * *